(12) United States Patent
Hasegawa et al.

(10) Patent No.: US 10,669,446 B2
(45) Date of Patent: Jun. 2, 2020

(54) WATER-BASED COATING COMPOSITION

(71) Applicant: KANSAI PAINT CO., LTD., Hyogo (JP)

(72) Inventors: Yosuke Hasegawa, Kanagawa (JP); Hiroshi Kitagawa, Kanagawa (JP); Katsunori Hirai, Kanagawa (JP)

(73) Assignee: KANSAI PAINT CO., LTD., Hyogo (JP)

( * ) Notice: Subject to any disclaimer, the term of this patent is extended or adjusted under 35 U.S.C. 154(b) by 22 days.

(21) Appl. No.: 16/081,477

(22) PCT Filed: Mar. 6, 2017

(86) PCT No.: PCT/JP2017/008670
§ 371 (c)(1),
(2) Date: Aug. 31, 2018

(87) PCT Pub. No.: WO2017/154808
PCT Pub. Date: Sep. 14, 2017

(65) Prior Publication Data
US 2019/0071586 A1   Mar. 7, 2019

(30) Foreign Application Priority Data
Mar. 9, 2016 (JP) .................. 2016-045648

(51) Int. Cl.
| | | |
|---|---|---|
| *C09D 167/06* | (2006.01) | |
| *C09D 7/65* | (2018.01) | |
| *C09D 167/00* | (2006.01) | |
| *C09D 5/02* | (2006.01) | |
| *C09D 7/40* | (2018.01) | |
| *C08L 33/06* | (2006.01) | |
| *C08L 67/08* | (2006.01) | |

(52) U.S. Cl.
CPC ............ *C09D 167/06* (2013.01); *C09D 5/02* (2013.01); *C09D 7/40* (2018.01); *C09D 7/65* (2018.01); *C09D 167/00* (2013.01); *C08L 33/066* (2013.01); *C08L 67/08* (2013.01)

(58) Field of Classification Search
CPC ................. C09D 167/06; C09D 7/65
USPC ........................................... 524/507
See application file for complete search history.

(56) References Cited

U.S. PATENT DOCUMENTS

| | | |
|---|---|---|
| 2004/0242756 A1 | 12/2004 | Komazaki et al. |
| 2006/0100332 A1 | 5/2006 | Gertzmann et al. |
| 2007/0259123 A1 | 11/2007 | Nagano et al. |
| 2008/0139736 A1 | 6/2008 | Yamada et al. |
| 2009/0075063 A1 | 3/2009 | Iida et al. |
| 2010/0021742 A1 | 1/2010 | Kataoka et al. |
| 2015/0056376 A1 | 2/2015 | Ishikura et al. |
| 2015/0232693 A1* | 8/2015 | Ishikura ............ C08G 18/6216 428/423.1 |

FOREIGN PATENT DOCUMENTS

| | | |
|---|---|---|
| CN | 1781960 | 6/2006 |
| EP | 2 905 084 | 8/2015 |
| JP | 2002-146282 | 5/2002 |
| JP | 2004-43524 | 2/2004 |
| JP | 2004-67995 | 3/2004 |
| JP | 2008-144063 | 6/2008 |
| JP | 2009-91571 | 4/2009 |
| JP | 2012-184370 | 9/2012 |
| WO | 2006/019171 | 2/2006 |
| WO | 2007/119760 | 10/2007 |
| WO | 2013/151143 | 10/2013 |

OTHER PUBLICATIONS

International Search Report dated May 30, 2017 in International (PCT) Application No. PCT/JP2017/008670.
Extended European Search Report dated Nov. 20, 2019 in corresponding European Patent Application No. 17763148.8.

* cited by examiner

*Primary Examiner* — Deve V Hall
(74) *Attorney, Agent, or Firm* — Wenderoth, Lind & Ponack, L.L.P.

(57) ABSTRACT

An aqueous coating composition containing an acrylic-modified polyester resin (A) and a reactive-group-containing resin (B), the acrylic-modified polyester resin (A) comprising as a monomer component constituting the acrylic part, a polyoxyalkylene group-containing unsaturated monomer having a weight average molecular weight of 400 or more, and the proportion of compounds having 6 or more carbon atoms of the total amount of the polyester-constituting components being 50 mass % or more.

8 Claims, No Drawings

WATER-BASED COATING COMPOSITION

CROSS-REFERENCE TO RELATED PATENT APPLICATIONS

This application claims priority to Japanese Patent Application No. 2016-045648, filed on Mar. 9, 2016, the disclosure of which is incorporated herein by reference in its entirety.

TECHNICAL FIELD

The present invention chiefly relates to an aqueous coating composition.

BACKGROUND ART

There has been a demand for the reduction in volatile organic compounds (VOC) released from coating compositions from the viewpoint of global environmental protection, and there have been ongoing rapid shifts from solvent-based coating compositions to aqueous coating compositions in various fields.

A considerable amount of solvent-based coating compositions were previously used also in automobile coating, and reduction of VOCs released from those coating compositions was an urgent matter. A range of coating compositions used in automobile coating steps for undercoating, intermediate coating, and top coating have shifted from organic-solvent-based coating compositions to aqueous coating compositions, and coating with aqueous coating compositions has become predominant.

Additionally, in order to decrease the environmental load, there has been an approach to shortening the coating step by omitting part of the heat-curing step (mainly omitting the heat-curing step performed after intermediate coating), which used to be performed for each of the intermediate coating film layer and the top coating film layer. Automobile coating performed in such a shortened step is now becoming mainstream.

Typically, an automobile body, in particular its exterior panel part, is provided with a multilayer coating film composed of an undercoating film excellent in corrosion resistance, an intermediate coating film excellent in smoothness and chipping resistance, and a top coating film excellent in appearance and environmental load resistance, for the purpose of imparting excellent corrosion resistance and appearance to the body.

Of the coating compositions, intermediate automobile coating compositions, in particular, are required to exhibit excellent chipping resistance (chipping: coating film damage caused by small pebbles on the road being kicked up and hitting the coating film), adhesion to the undercoating film, storage stability (pigment dispersibility and circulation stability in the coating line pipe), finished appearance, coating workability (popping resistance and sag resistance), etc. The market demands that all of these requirements be met at high levels, with the recent shift into aqueous compositions and even the shortened coating step being addressed.

For example, PTL 1 discloses an aqueous resin composition containing (A) a polyester resin having an acid value of 10 to 50 and a hydroxy value of 20 to 150, (B) a vinyl-modified polyester resin having an acid value of 20 to 100 and a hydroxy value of 20 to 150, and (C) a curing agent, wherein the polyester resin (A) includes a structural unit derived from an aromatic acid and an alicyclic acid; and the vinyl-modified polyester resin (B) contains a fatty acid chain to which a vinyl polymer part is bound and is composed of a specific amount of the vinyl polymer part and a specific amount of a structural unit derived from an α, β-ethylenically unsaturated monomer containing carboxyl groups.

However, a multilayer coating film containing an intermediate coating film formed of the aqueous coating composition of PTL 1 may result in insufficient chipping resistance or insufficient levels of coating workability (popping resistance) due to the lack of flexibility, for example.

PTL 2 discloses an aqueous curable resin composition containing a (meth)acrylic-modified polyester resin, (meth)acrylic resin particles having an average particle size of 0.1 to 2 μm, a melamine resin, and water.

However, a multilayer coating film containing an intermediate coating film formed of the aqueous curable resin composition of PTL 2 may result in insufficient chipping resistance or insufficient levels of finished appearance due to the influence of (meth)acrylic resin particles.

PTL 3 discloses an aqueous intermediate coating composition containing a resin component and a curing agent, wherein the resin component is a graft polymer having a polyester resin as the main polymer and an acrylic resin as a branch polymer.

However, a multilayer coating film containing an intermediate coating film formed of the aqueous intermediate coating composition of PTL 3 may result in insufficient levels of finished appearance and coating workability (popping resistance), and poor circulation stability in the coating line pipe.

CITATION LIST

Patent Literature

PTL 1: JP2004-067995A
PTL 2: JP2008-144063A
PTL 3: JP2004-043524A

DISCLOSURE OF THE INVENTION

Technical Problem

An object of the present invention is to provide an aqueous coating composition excellent in finished appearance and storage stability, excellent in chipping resistance due to favorable coating film physical properties, and even excellent in coating workability under severe conditions, such as in the shortened coating step.

Solution to Problem

The present inventors conducted extensive research to achieve the object, and found that the object can be achieved by the use of an acrylic-modified polyester resin containing an acrylic part having a polyoxyalkylene chain and a polyester part in which the proportion of one or more compound components having 6 or more carbon atoms is 50 mass % or more of the total amount of the polyester-constituting components. The inventors then completed the invention.

Specifically, the present invention includes the following embodiments.

Item 1

An aqueous coating composition comprising
an acrylic-modified polyester resin (A) and
a reactive-group-containing resin (B),
the acrylic-modified polyester resin (A)
comprising as a monomer component constituting the acrylic part, a polyoxyalkylene group-containing unsaturated monomer having a weight average molecular weight of 400 or more, and having a proportion of compounds having 6 or more carbon atoms in the total amount in the polyester-constituting components of 50 mass % or more.

Item 2

The aqueous coating composition according to Item 1, wherein the compound having 6 or more carbon atoms in the components constituting the polyester part is a compound containing an alkylene group having 4 or more carbon atoms.

Item 3

The aqueous coating composition according to Item 1 or 2, wherein the proportion of the acrylic part is 5 to 40 mass % and the proportion of the polyester part is 60 to 95 mass % of the acrylic-modified polyester resin (A) (the total amount of the acrylic part and the polyester part).

Item 4

The aqueous coating composition according to any one of Items 1 to 3, wherein the acrylic part of the acrylic-modified polyester resin (A) has a hydroxy value of 0 to 70 mgKOH/g.

Item 5

The aqueous coating composition according to any one of Items 1 to 4, wherein the polyester part of the acrylic-modified polyester resin (A) has an acid value of 0 to 20 mgKOH/g.

Item 6

The aqueous coating composition according to any one of Items 1 to 5, further comprising a crosslinking agent (C).

Item 7

An article comprising a coating film obtained by curing the aqueous coating composition of any one of Items 1 to 6.

Item 8

A method for forming a coating film, the method comprising applying the aqueous coating composition of any one of Items 1 to 6 to a substrate.

Advantageous Effects of Invention

The main feature of the aqueous coating composition of the present invention is that the aqueous coating composition comprises an acrylic-modified polyester resin that contains an acrylic part having a polyoxyalkylene chain and a polyester part in which the proportion of the component of one or more compounds having 6 or more carbon atoms is 50 mass % or more of the total amount of the polyester-constituting components.

The acrylic-modified polyester resin exhibits excellent dispersion stability in an aqueous resin system because of the specific amount of polyoxyalkylene chains contained in its acrylic part, also contributes to the viscosity of the formed painted coating film due to the bulk effect brought about by the polyoxyalkylene chains, and prevents the layers of the uncured multilayer coating film from blending to each other. Additionally, because a certain amount or more of the polyester part is composed of compound materials having 6 or more carbon atoms, which contribute to a relatively soft structure formation, the acrylic-modified polyester resin also has excellent physical properties, such as chipping resistance. When used as a constituent of a coating composition, the acrylic-modified polyester resin, due to this functionally controlled structure, can efficiently exhibit the features attributed to the individual components of the acrylic part and the polyester part.

As noted above, an effect of the aqueous coating composition according to the present invention is that an aqueous coating composition excellent in finished appearance and storage stability, excellent in chipping resistance due to favorable coating film physical properties, and even excellent in coating workability under severe conditions, such as in the shortened coating step, is obtained.

BEST MODE FOR CARRYING OUT THE INVENTION

The following describes the aqueous coating composition according to the present invention in more detail.

The aqueous coating composition of the present invention (which may be hereinafter referred to as "the present coating composition") comprises
an acrylic-modified polyester resin (A) and
a reactive-group-containing resin (B),
the acrylic-modified polyester resin (A)
comprising as a monomer component constituting the acrylic part, a polyoxyalkylene group-containing unsaturated monomer having a weight average molecular weight of 400 or more, and
having a proportion of compounds having 6 or more carbon atoms in the total amount in the polyester-constituting components of 50 mass % or more.

meisa

Acrylic-Modified Polyester Resin (A)

The acrylic-modified polyester resin (A) contains,
as a monomer component constituting the acrylic part, a polyoxyalkylene group-containing unsaturated monomer having a weight average molecular weight of 400 or more; and
components constituting the polyester part wherein the proportion of a compound having 6 or more carbon atoms is 50 mass % or more of the total amount of the polyester-constituting components.

The acrylic-modified polyester resin contains as the main chain a polyester part formed from a polyester resin that is modified by an acrylic part formed from an acrylic (co) polymer. When the modification is graft modification, the polyester part is the main polymer, and the acrylic part is the branch polymer, with the acrylic part bound to the polyester part via a graft point.

The method for producing the acrylic-modified polyester resin (A) is not particularly limited, and the acrylic-modified polyester resin (A) can be synthesized by an ordinary method. Specific examples include a method using polymerization of a mixture of an unsaturated-group-containing polyester resin and an unsaturated monomer, and a method using esterification of a polyester resin and an acrylic resin.

The method for obtaining the acrylic-modified polyester resin (A) by polymerizing a mixture of an unsaturated-group-containing polyester resin and an unsaturated monomer uses unsaturated groups in a polyester resin as graft points in polymerizing an unsaturated monomer to acrylic-modify the polyester resin.

The method for obtaining an unsaturated-group-containing polyester resin is not particularly limited. An example of the method is that a polyester resin is synthesized by an ordinary method, and the hydroxyl groups of the polyester resin are reacted with an acid anhydride group-containing unsaturated monomer to add graft points to the polyester resin. The method for producing a polyester resin includes esterification or transesterification of an acid component and an alcohol component.

Alternatively, an unsaturated-group-containing polyester resin can be synthesized by esterification or transesterification of an acid component containing a polybasic acid having unsaturated groups and an alcohol component. From the convenience of synthesis, it is preferable to synthesize an unsaturated-group-containing polyester resin by a method using esterification or transesterification of an acid component containing a polybasic acid having unsaturated groups and an alcohol component. In particular, it is preferable to use an acid component containing an acid anhydride group-containing unsaturated monomer as a polybasic acid having unsaturated groups, for example, from the standpoint of storage stability.

As used here, "acid anhydride group-containing unsaturated monomer" refers to a compound having one acid anhydride group and one unsaturated group per molecule. Specifically, compounds having less than 6 carbon atoms include maleic anhydride, itaconic anhydride, fumaric anhydride, citraconic anhydride, mesaconic anhydride, 2-pentene diacid anhydride, methylene succinic anhydride, and acetylene dicarboxylic anhydride; and compounds having 6 or more carbon atoms include unsaturated dicarboxylic anhydrides, such as tetrahydrophthalic anhydride, allylmalonic anhydride, isopropylidene succinic anhydride, 2,4-hexadiene diacid anhydride, and 4-cyclohexene-1,2-dicarboxylic anhydride. Of these, maleic anhydride is preferable from the standpoint of reactivity, costs, and availability.

Examples of acid components other than the acid anhydride group-containing unsaturated monomer include aliphatic polybasic acid, alicyclic polybasic acid, and aromatic polybasic acid.

The aliphatic polybasic acid typically refers to an aliphatic compound having 2 or more carboxyl groups per molecule, an acid anhydride of the aliphatic compound, or an ester of the aliphatic compound. Examples of the aliphatic polybasic acid include aliphatic polycarboxylic acid; anhydrides of aliphatic polycarboxylic acid; and esters of lower alkyl having about 1 to 4 carbon atoms and the aliphatic polycarboxylic acid. The aliphatic polycarboxylic acid includes compounds having less than 6 carbon atoms, such as succinic acid and glutaric acid; and compounds having 6 or more carbon atoms, such as adipic acid, pimelic acid, suberic acid, azelaic acid, sebacic acid, undecanedioic acid, dodecanedioic acid, brassylic acid, octadecanedioic acid, citric acid, and butanetetracarboxylic acid. These aliphatic polybasic acids may be used singly or in a combination of two or more.

The aliphatic polybasic acid for use is particularly preferably adipic acid and/or adipic anhydride, from the standpoint of smoothness of the obtained coating film.

The alicyclic polybasic acid typically refers to a compound having one or more alicyclic structures and 2 or more carboxyl groups per molecule, an acid anhydride of the compound, or an ester of the compound. The alicyclic structure is mainly a 4- to 6-membered ring structure. Examples of the alicyclic polybasic acid include alicyclic polycarboxylic acid having 6 or more carbon atoms, such as 1,2-cyclohexanedicarboxylic acid, 1,3-cyclohexanedicarboxylic acid, 1,4-cyclohexanedicarboxylic acid, 4-cyclohexene-1,2-dicarboxylic acid, 3-methyl-1,2-cyclohexanedicarboxylic acid, 4-methyl-1,2-cyclohexanedicarboxylic acid, 1,2,4-cyclohexane tricarboxylic acid, and 1,3,5-cyclohexane tricarboxylic acid; anhydrides of the alicyclic polycarboxylic acid; and esters of lower alkyl having about 1 to 4 carbon atoms and the alicyclic polycarboxylic acid. These alicyclic polybasic acids may be used singly or in a combination of two or more.

The alicyclic polybasic acid for use is preferably 1,2-cyclohexanedicarboxylic acid, 1,2-cyclohexanedicarboxylic anhydride, 1,3-cyclohexanedicarboxylic acid, 1,4-cyclohexanedicarboxylic acid, and 4-cyclohexene-1,2-dicarboxylic acid, from the standpoint of smoothness of the obtained coating film. Of these, 1,2-cyclohexanedicarboxylic acid and/or 1,2-cyclohexanedicarboxylic anhydride are more preferably used.

The aromatic polybasic acid typically refers to an aromatic compound having two or more carboxyl groups per molecule, or an ester of the aromatic compound. Examples include aromatic polycarboxylic acids having 6 or more carbon atoms, such as phthalic acid, isophthalic acid, terephthalic acid, naphthalene dicarboxylic acid, 4,4'-biphenyl dicarboxylic acid, trimellitic acid, and pyromellitic acid; and esters of lower alkyl having about 1 to 4 carbon atoms and the aromatic polycarboxylic acid. These aromatic polybasic acids may be used singly or in a combination of two or more.

The aromatic polybasic acid for use is preferably phthalic acid, isophthalic acid, and trimellitic acid.

An acid component other than the aliphatic polybasic acid, alicyclic polybasic acid, and aromatic polybasic acid may also be used. Such an acid component is not particularly limited. Examples include fatty acids having 6 or more carbon atoms, such as coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid; monocarboxylic acids having 6 or more carbon atoms, such as lauric acid, myristic acid, palmitic acid, stearic acid, oleic acid, linoleic acid, linolenic acid, benzoic acid, p-tert-butyl benzoic acid, cyclohexanoic acid, and 10-phenyloctadecanoic acid; and hydroxycarboxylic acids having 6 or more carbon atoms, such as 3-hydroxy-4-ethoxybenzoic acid. These acid components may be used singly or in a combination of two or more.

For the alcohol component, a polyhydric alcohol containing 2 or more hydroxyl groups per molecule may be used. Examples of the polyhydric alcohol include polyhydric alcohols having less than 6 carbon atoms, such as ethylene glycol, propylene glycol, diethylene glycol, trimethylene glycol, 1,4-butanediol, 1,3-butanediol, 2,3-butanediol, 1,2-butanediol, 2-methyl-1,3-propanediol, 3-methyl-1,2-butanediol, 1,2-pentanediol, 1,5-pentanediol, 1,4-pentanediol, 2,4-pentanediol, 2,3-dimethyltrimethylene glycol, neopentylglycol, dimethylolpropionic acid, glycerol, trimethylolethane, and pentaerythritol; dihydric alcohols, such as tetraethylene glycol, dipropylene glycol, 2-butyl-2-ethyl-1,3-propanediol, 3-methyl-4,3-pentanediol, 3-methyl-1,5-pentanediol, 2,2,4-trimethyl-1,3-pentanediol, 1,6-hexanediol, 1,5-hexanediol, 1,4-hexanediol, 2,5-hexanediol, 1,4-cyclohexane dimethanol, tricyclodecane dimethanol, neopentyl glycol hydroxypivalate, hydrogenated bisphenol A, and hydrogenated bisphenol F; polylactone diols obtained by adding a lactone compound, such as ε-caprolactone, to these dihydric alcohols; ester diol compounds, such as bis(hydroxyethyl)terephthalate; polyether diol compounds, such as bisphenol A alkylene oxide adducts, polyethylene glycol, polypropylene glycol, and polybutylene glycol; trihydric or higher hydric alcohols, such as trimethylol propane, diglycerol, triglycerol, 1,2,6-hexanetriol, dipentaerythritol, tris(2-hydroxyethyl) isocyanuric acid, sorbitol, and mannitol; polylactone polyol compounds obtained by adding a lactone compound, such as ε-caprolactone, to these trihydric or higher hydric alcohols; and polyhydric alcohols having 6 or more carbon atoms, such as glycerol fatty acid ester.

An alcohol component other than these polyhydric alcohols may also be used. Such an alcohol component is not particularly limited, and examples include monohydric alcohols having less than 6 carbon atoms, such as methanol, ethanol, propyl alcohol, and butyl alcohol; monoalcohols, such as stearyl alcohol, and 2-phenoxy ethanol; and monohydric alcohols having 6 or more carbon atoms, such as alcohol compounds obtained by reacting an acid with a monoepoxy compound, such as propylene oxide, butylene oxide, and Cardura E10 (trade name: produced by Hexion Specialty Chemicals, a glycidyl ester of synthetic, highly branched, saturated fatty acid).

As another method for obtaining an unsaturated-group-containing polyester resin, a method using an unsaturated fatty acid, such as oleic acid and myristic acid (both are a compound having 6 or more carbon atoms), as part of the acid component may also be used. This method uses unsaturated groups in the unsaturated fatty acid as graft points.

Regarding the components constituting the polyester part of the acrylic-modified polyester resin (A), the proportion of the one or more compounds having 6 or more carbon atoms is 50 mass % or more, preferably 70 mass % or more, and more preferably 80 mass % or more of the total amount of the polyester-constituting components, from the standpoint of chipping resistance and finished appearance of the obtained coating film.

As used here, "components constituting the polyester part" and "polyester-constituting components" refer to the acid component and alcohol component used in producing the polyester part.

Of the compounds having 6 or more carbon atoms, compounds containing alkylene groups each having 4 or more carbon atoms, and particularly 6 or more carbon atoms, are particularly suitably used.

Examples of these compounds as an acid component include adipic acid, azelaic acid, sebacic acid, nonanedioic acid, and dodecanedioic acid, and examples as an alcohol component include 1,6-hexanediol, 1,7-heptanediol, 1,9-nonanediol, and 2-butyl-2-ethyl-1,3-propanediol.

The method for producing an unsaturated-group-containing polyester resin is not particularly limited, and an unsaturated-group-containing polyester resin can be produced in accordance with an ordinary method. For example, an unsaturated-group-containing polyester resin can be produced by heating an acid component and an alcohol component in a nitrogen stream at 150 to 250° C. for 5 to 10 hours to perform esterification or transesterification of the acid component and the alcohol component.

When performing esterification or transesterification of the acid component and the alcohol component, these components may be added to a reactor at one time, or one component or both components may be added in several portions or in a continuous manner. After synthesis of an unsaturated-group-containing polyester resin, the obtained unsaturated-group-containing polyester resin may be half-esterified to prepare a polyester resin containing unsaturated groups, carboxyl groups, and hydroxyl groups; or after synthesis of a polyester resin containing unsaturated groups and carboxyl groups, an alcohol component may be added thereto to prepare a polyester resin containing unsaturated groups, carboxyl groups, and hydroxyl groups.

In the esterification or transesterification, a known catalyst, such as dibutyltin oxide, antimony trioxide, zinc acetate, manganese acetate, cobalt acetate, calcium acetate, lead acetate, tetrabutyl titanate, and tetraisopropyl titanate, may be used to facilitate the reaction.

The unsaturated-group-containing polyester resin may be modified with a fatty acid, fat and oil, a monoepoxy compound, a polyisocyanate compound, or the like during or after the preparation of the resin.

Examples of the fatty acid include coconut oil fatty acid, cottonseed oil fatty acid, hempseed oil fatty acid, rice bran oil fatty acid, fish oil fatty acid, tall oil fatty acid, soybean oil fatty acid, linseed oil fatty acid, tung oil fatty acid, rapeseed oil fatty acid, castor oil fatty acid, dehydrated castor oil fatty acid, and safflower oil fatty acid. Examples of the fat and oil include fatty acid oils of these fatty acids. For the monoepoxy compound, Cardura E10 (trade name: produced by Hexion Specialty Chemicals, a glycidyl ester of synthetic, highly branched, saturated fatty acid), for example, may be suitably used.

Examples of the polyisocyanate compound include aliphatic diisocyanate compounds, such as lysine diisocyanate, hexamethylene diisocyanate, and trimethylhexane diisocyanate; alicyclic diisocyanate compounds, such as hydrogenated xylylene diisocyanate, isophorone diisocyanate, methylcyclohexane-2,4-diisocyanate, methylcyclohexane-2,6-diisocyanate, 4,4'-methylenebis(cyclohexylisocyanate), and 1,3-(isocyanatomethyl)cyclohexane; aromatic diisocyanate compounds, such as tolylene diisocyanate, xylylene diisocyanate, and diphenylmethane diisocyanate; organic polyisocyanates themselves, such as trivalent or higher-valent polyisocyanates including lysine triisocyanate; adducts of these organic polyisocyanates with a polyhydric alcohol, a low-molecular-weight polyester resin, water, etc.; and cyclic polymers of these organic polyisocyanates (e.g., isocyanurate), and biuret adducts of these organic polyisocyanates. These polyisocyanate compounds may be used singly or in a combination of two or more.

A feature of the acrylic-modified polyester resin (A) is that the acrylic-modified polyester resin (A) contains a polyoxyalkylene group-containing unsaturated monomer having a weight average molecular weight of 400 or more, preferably 800 or more, and more preferably 1000 or more, as a monomer component constituting the acrylic part.

As used here, "monomer component constituting the acrylic part" refers to a monomer component used to produce the acrylic part. The monomer component is an unsaturated monomer.

For the monomer component constituting the acrylic part, polyoxyalkylene group-containing unsaturated monomers and other unsaturated monomers may be used. These unsaturated monomers may be used singly or in a combination of two or more.

The polyoxyalkylene group-containing monomer is an unsaturated monomer having both an unsaturated group and a polyoxyalkylene group, and an unsaturated monomer represented by the following formula (I) may suitably be used:

$$CH_2=CR^1COO(AO)_pR^2 \qquad (I)$$

wherein AO represents an oxyalkylene unit having 2 to 4 carbon atoms; however, p number of oxyalkylene units may be the same or different, wherein when two or more oxyalkylene units are different, the oxyalkylene units may be added by block addition, random addition, or alternate addition; $R^1$ represents hydrogen or methyl; p represents an integer of 1 to 50; and $R^2$ represents hydrogen, $C_{1-20}$ alkyl, or phenyl optionally substituted with $C_{1-9}$ alkyl. The monomer preferably has an oxyethylene unit, an oxypropylene unit, or an oxytetramethylen unit as a structural unit (as an oxyalkylene unit).

Specific examples of the polyoxyalkylene group-containing monomer include methoxy polyethylene glycol mono (meth)acrylate, polyethylene glycol mono(meth)acrylate, methoxy polypropylene glycol mono(meth)acrylate, polypropylene glycol mono(meth)acrylate, ethylene glycol/propylene glycol (meth)acrylate, poly(ethylene glycol/propylene glycol) mono(meth)acrylate, octoxy polyethylene glycol/polypropylene glycol mono(meth)acrylate, octoxy poly(ethylene glycol/propylene glycol) mono(meth)acrylate, stearoxy polyethylene glycol/polypropylene glycol mono(meth)acrylate, stearoxy poly(ethylene glycol/propylene glycol) mono(meth)acrylate, nonyl phenoxy polyethylene glycol/polypropylene glycol mono(meth)acrylate, nonyl phenoxy poly(ethylene glycol/propylene glycol) mono (meth)acrylate, propylene glycol/tetramethylene glycol mono(meth)acrylate, poly(propylene glycol/tetramethylene glycol) mono(meth)acrylate, propylene glycol/polybutylene glycol mono(meth)acrylate, and poly(propylene glycol/butylene glycol) mono(meth)acrylate. These may be used singly or in a combination of two or more.

Of the compounds listed above, those usable for the coating composition of the present invention are polyoxyalkylene group-containing unsaturated monomers having a weight average molecular weight of 400 or more, preferably 800 or more, and more preferably 1000 or more.

The use of the polyoxyalkylene group-containing unsaturated monomer as a monomer component constituting the acrylic part of the acrylic-modified polyester resin (A) provides an aqueous coating composition excellent in storage stability, finished appearance of the obtained coating film, and coating workability.

The content of the polyoxyalkylene group-containing monomer in the acrylic part of the acrylic-modified polyester resin (A) is preferably 1 to 30 mass %, particularly 5 to 30 mass %, and still particularly 10 to 30 mass % of the total amount of the acrylic part constituting components, from the standpoint of storage stability, finished appearance of the obtained coating film, and coating workability.

The content of the polyoxyalkylene group-containing monomer in the acrylic-modified polyester resin (A) is preferably 1 to 5 mass %, particularly 1.5 to 5 mass %, and still particularly 2 to 5 mass %.

Examples of other unsaturated monomers for use include the following monomers (i) to (xix):

(i) Alkyl or cycloalkyl (meth)acrylate: for example, methyl (meth)acrylate, ethyl (meth)acrylate, n-propyl (meth)acrylate, isopropyl (meth)acrylate, n-butyl (meth)acrylate, isobutyl (meth)acrylate, tert-butyl (meth)acrylate, n-hexyl (meth)acrylate, n-octyl (meth)acrylate, 2-ethylhexyl (meth) acrylate, nonyl (meth)acrylate, tridecyl (meth)acrylate, lauryl (meth)acrylate, stearyl (meth)acrylate, isostearyl (meth) acrylate, cyclohexyl (meth)acrylate, methyl cyclohexyl (meth)acrylate, t-butyl cyclohexyl (meth)acrylate, cyclododecyl (meth)acrylate, and tricyclodecanyl (meth)acrylate;
(ii) Unsaturated monomers having an isobornyl group: isobornyl (meth)acrylate etc.;
(iii) Unsaturated monomers having an adamantyl group: adamantyl (meth)acrylate etc.;
(iv) Unsaturated monomers having a tricyclodecenyl group: tricyclodecenyl (meth)acrylate etc.;
(v) Aromatic-ring-containing unsaturated monomers: benzyl (meth)acrylate, styrene, α-methyl styrene, vinyl toluene, etc.;
(vi) Unsaturated monomers having an alkoxy silyl group: vinyltrimethoxysilane, vinyltriethoxysilane, vinyltris(2-methoxyethoxy) silane, γ-(meth)acryloyloxypropyl trimethoxysilane, γ-(meth)acryloyloxypropyl triethoxysilane, etc.;
(vii) Unsaturated monomers having a fluorinated alkyl group: perfluoroalkyl (meth)acrylate, such as perfluorobutylethyl (meth)acrylate and perfluorooctylethyl (meth)acrylate, and fluoroolefins, (viii) Unsaturated monomers having a photopolymerizable functional group, such as a maleimide group;
(ix) Vinyl compounds: N-vinyl pyrrolidone, ethylene, butadiene, chloroprene, vinyl propionate, vinyl acetate, etc.;
(x) Carboxy-containing unsaturated monomers: (meth) acrylic acid, maleic acid, crotonic acid, β-carboxy ethyl acrylate, etc.;
(xi) Hydroxy-containing unsaturated monomers: monoester compounds of (meth)acrylic acid, such as 2-hydroxyethyl (meth)acrylate, 2-hydroxypropyl (meth)acrylate, 3-hydroxypropyl (meth)acrylate, and 4-hydroxybutyl (meth) acrylate, with a dihydric alcohol having 2 to 8 carbon atoms; ε-caprolactone modified products of monoester compounds of (meth)acrylic acid and a dihydric alcohol having 2 to 8 carbon atoms; N-hydroxymethyl (meth)acrylamide; allyl alcohols etc.;
(xii) Nitrogen-containing unsaturated monomers: (meth) acrylonitrile, (meth)acrylamide, N,N-dimethylaminoethyl (meth)acrylate, N,N-diethylaminoethyl (meth)acrylate, N,N-dimethylaminopropyl (meth)acrylamide, methylene bis (meth)acrylamide, ethylene bis(meth)acrylamide, adducts of glycidyl (meth)acrylate and amine compounds etc.;
(xiii) Unsaturated monomers having two or more unsaturated groups per molecule: allyl (meth)acrylate, 1,6-hexanediol di(meth)acrylate, etc.;
(xiv) Epoxy-containing unsaturated monomers: glycidyl (meth)acrylate, β-methyl glycidyl (meth)acrylate, 3,4-epoxycyclohexylmethyl (meth)acrylate, 3,4-epoxycyclohexyl ethyl (meth)acrylate, 3,4-epoxycyclohexylpropyl (meth) acrylate, allyl glycidyl ether, etc.;
(xv) Sulfonic acid group-containing unsaturated monomers: 2-acrylamide-2-methylpropanesulfonic acid, 2-sulfoethyl (meth)acrylate, allylsulfonic acid, 4-styrenesulfonic acid, etc.; sodium salts and ammonium salts of these sulfonic acids etc.;
(xvi) Phosphoric group-containing unsaturated monomers: acid phosphoxyethyl (meth)acrylate, acid phosphoxypropyl (meth)acrylate, acid phosphoxypoly(oxyethylene) glycol (meth)acrylate, acid phosphoxypoly(oxypropylene) glycol (meth)acrylate, etc.;
(xvii) Unsaturated monomers having an UV-absorbing functional group: 2-hydroxy-4-(3-methacryloyloxy-2-hydroxypropoxy)benzophenone, 2-hydroxy-4-(3-acryloyloxy-2-hydroxypropoxy)benzophenone, 2,2'-dihydroxy-4-(3-methacryloyloxy-2-hydroxypropoxy)benzophenone, 2,2'-dihydroxy-4-(3-acryloyloxy-2-hydroxypropoxy) benzophenone, 2-(2'-hydroxy-5'-methacryloyloxyethylphenyl)-2H-benzotriazole, etc.;
(xiii) UV-stable unsaturated monomers: 4-(meth)acryloyloxy-1,2,2,6,6-pentamethylpiperidine, 4-(meth)acryloyloxy-2,2,6,6-tetramethylpiperidine, 4-cyano-4-(meth)acryloylamino-2,2,6,6-tetramethylpiperidine, 1-(meth)acryloyl-4-(meth)acryloylamino-2,2,6,6-tetramethylpiperidine, 1-(meth)acryloyl-4-cyano-4-(meth)acryloylamino-2,2,6,6-tetramethylpiperidine, 4-crotonoyloxy-2,2,6,6-tetramethylpiperidine, 4-crotonoylamino-2,2,6,6-tetramethylpiperidine, 1-crotonoyl-4-crotonoyloxy-2,2,6,6-tetramethylpiperidine, etc.;
(xix) Unsaturated monomers having a carbonyl group: acrolein, diacetone acrylamide, diacetone methacrylamide, acetoacetoxyethyl methacrylate, formylstyrol, $C_{4-7}$ vinyl alkyl ketone (e.g., vinyl methyl ketone, vinyl ethyl ketone, and vinyl butyl ketone), etc.

As used here, "unsaturated group" refers to a radically polymerizable unsaturated group. Examples of the unsaturated group include vinyl and (meth)acryloyl.

As used here, "(meth)acrylate" refers to acrylate or methacrylate. "(Meth)acrylic acid" refers to acrylic acid or methacrylic acid. "(Meth)acryloyl" refers to acryloyl or methacryloyl. "(Meth)acrylamide" refers to acrylamide or methacrylamide.

The use of a carboxy-containing unsaturated monomer (x) and an aromatic ring-containing unsaturated monomer (v) for at least part of other unsaturated monomer is preferable from the standpoint of its graft reactivity with a polyester resin and water dispersibility of the obtained acrylic-modified polyester resin (A).

When a carboxy-containing unsaturated monomer (x) and an aromatic-ring-containing unsaturated monomer (v) are used, the proportion of each component of the total amount of the unsaturated monomers (the total amount of the acrylic part constituting components) is preferably as follows: a carboxy-containing unsaturated monomer (x) is present in an amount of 1 to 40 mass %, particularly 5 to 40 mass %, and still particularly 10 to 40 mass %; and an aromatic-ring-containing unsaturated monomer (v) is present in an amount of 1 to 30 mass %, particularly 5 to 30 mass %, and still particularly 10 to 30 mass %.

The acrylic-modified polyester resin (A) can be synthesized, for example, by copolymerizing the unsaturated-group-containing polyester resin and the unsaturated monomer in accordance with a known method.

Specifically, the acrylic-modified polyester resin (A) can be synthesized, for example, by adding an unsaturated-group-containing polyester resin, an unsaturated monomer, and a radical initiator, optionally with a chain transfer agent to a reactor, and heating the mixture at 90 to 160° C. for 1 to 5 hours. From the standpoint of reaction temperature control, the unsaturated-group-containing polyester resin may be first added to the reactor, and then other materials may be added over time.

The polymerization initiator for use may be compounds such as organic peroxide-based compounds and azo-based compounds. Examples include organic peroxide-based polymerization initiators, such as benzoyl peroxide, t-butylperoxy-2-ethylhexanoate, di-t-butylperoxide, t-butylperoxy benzoate, and t-amylperoxy-2-ethylhexanoate; and azo-based polymerization initiators, such as azobisisobutyronitrile and azobisdimethylvaleronitrile. The chain transfer agent includes α-methyl styrene dimers and mercaptans.

The method for obtaining the acrylic-modified polyester resin (A) by esterification of a polyester resin and an acrylic resin involves transesterification of part of a polyester resin with an acrylic resin to graft the acrylic resin to the polyester resin.

The proportion of the acrylic part and the polyester part in the acrylic-modified polyester resin (A) is preferably as follows from the standpoint of the physical properties of the coating film: the acrylic part is present in an amount of 5 to 40 mass %, particularly 5 to 30 mass %, and still particularly 5 to 25 mass %, and the polyester part is present in an amount of 60 to 95 mass %, particularly 70 to 95 mass %, and still particularly 75 to 95 mass %, based on the acrylic-modified polyester resin (A) (the total amount of the acrylic part and the polyester part).

The acrylic-modified polyester resin (A) preferably has a hydroxy value of 20 to 200 mgKOH/g, particularly 30 to 150 mgKOH/g, and still particularly 30 to 100 mgKOH/g from the standpoint of curability and water resistance.

The hydroxy value of the acrylic part is preferably 0 to 70 mgKOH/g, particularly 0 to 50 mgKOH/g, and still particularly 0 to 30 mgKOH/g.

The hydroxy value of the polyester part is preferably 20 to 200 mgKOH/g, particularly 30 to 150 mgKOH/g, and still particularly 30 to 120 mgKOH/g.

The acrylic-modified polyester resin (A) preferably has an acid value of 10 to 100 mgKOH/g, particularly 15 to 80 mgKOH/g, and still particularly 15 to 60 mgKOH/g from the standpoint of water dispersibility.

The acid value of the acrylic part is preferably 50 to 500 mgKOH/g, particularly 80 to 400 mgKOH/g, and still particularly 100 to 300 mgKOH/g.

The acid value of the polyester part is preferably 0 to 20 mgKOH/g, particularly 0 to 15 mgKOH/g, and still particularly 0 to 10 mgKOH/g.

The acrylic-modified polyester resin (A) preferably has a number average molecular weight of 1000 to 10000, particularly 2000 to 10000, and still particularly 3000 to 10000 from the standpoint of coating film appearance, coating film physical properties, and chipping resistance.

As used here, "average molecular weight" refers to a value determined by converting the retention time (retention volume) measured with gel permeation chromatography (GPC) into a molecular weight of a polystyrene based on the retention time (retention volume) of a polystyrene standard with a known molecular weight measured under the same conditions. Specifically, a HLC-8120GPC gel permeation chromatograph analyzer (trade name, produced by Tosoh Corporation) is used, and four columns are used: TSKgel G4000HXL, TSKgel G3000HXL, TSKgel G2500HXL, and TSKgel G2000HXL (trade names, all produced by Tosoh Corporation). A differential refractometer is used as a detector, and measurement is performed under the following conditions: mobile phase: tetrahydrofuran, measurement temperature: 40° C., and flow rate: 1 mL/min.

The acrylic-modified polyester resin (A) is prepared into an aqueous dispersion by neutralizing the resin and dispersing it in water. The neutralizer for use includes amine compounds and ammonia. Examples of amine compounds include triethylamine, triethanolamine, dimethylethanolamine, diethylethanolamine, and morpholine. Of these, triethylamine and dimethylethanolamine, in particular, are suitably used. The degree of neutralization is not particularly limited. It is preferred that the degree of neutralization typically falls within the range of 0.3 to 1.0 equivalents relative to the acid groups in the resin.

The aqueous vehicle for an aqueous dispersion of the acrylic-modified polyester resin (A) may be only water, or a mixture of water and an organic solvent.

The organic solvent is preferably an alcohol solvent, an ether solvent, or the like. Specific examples include alcohol solvents, such as n-butanol; and ether solvents, such as ethylene glycol monobutyl ether, ethylene glycol monoisopropyl ether, ethylene glycol monomethyl ether, propylene glycol monomethyl ether, and diethylene glycol monoethyl ether. Ester solvents, such as ethyl acetate and butyl acetate, ketone solvents, such as methyl ethyl ketone and cyclohexanone, and aromatic hydrocarbon solvents, such as toluene and xylene, may also be used.

To neutralize and disperse the acrylic-modified polyester resin in an aqueous vehicle, an ordinary method may be used. Examples includes a method in which the acrylic-modified polyester resin is gradually added to a neutralizer-containing aqueous vehicle with stirring; a method in which the acrylic-modified polyester resin is neutralized with a neutralizer, and then an aqueous vehicle is added with stirring; and a method in which a neutralized product is added to an aqueous vehicle.

Reactive-Group-Containing Resin (B)

The reactive-group-containing resin is a resin other than the acrylic-modified polyester resin (A), and the type of the reactive-group-containing resin is not particularly limited as long as the resin contains reactive groups. Examples include acrylic resin, polyester resin, polyurethane resin, urethane-modified polyester resin, acrylic-modified urethane resin, and epoxy resin.

The reactive group refers to a functional group with reactivity that can undergo crosslinking reaction. Specifically, the reactive group includes functional groups with reactivity, such as a hydroxy group, an acid group, a carbonyl group, an N-methylol alkyl ether group, an isocyanate group, an epoxy group, an amino group, an alkoxy silyl group, a carbodiimide group, and a hydrazide group.

In the present invention, acrylic resin and polyester resin are suitably used. The following describes these resins in more detail.

Acrylic Resin

The acrylic resin is other than the acrylic-modified polyester resin (A) and can be synthesized by copolymerizing a polymerizable unsaturated monomer (typically a vinyl monomer) by a known method.

The acrylic resin may be either an acrylic resin synthesized by emulsion polymerization or an acrylic resin synthesized by solution polymerization, or an acrylic resin synthesized using both polymerization techniques. When synthesis is performed by solution polymerization, the organic solvent for use in the reaction is preferably a hydrophilic organic solvent, such as a propylene glycol ether solvent and a dipropylene glycol ether solvent. From the standpoint of water dispersibility, the acrylic resin is preferably those having an acid group such as the carboxyl group.

When synthesis is performed by emulsion polymerization, the acrylic resin is easily obtained, for example, by performing emulsion polymerization on the monomer components described above in the presence of an emulsifier. The emulsifier includes non-ionic surfactants, anionic surfactants, and reactive surfactants having copolymerizable unsaturated groups. The acrylic resin is obtained by emulsion polymerization using a polymerization initiator in the presence of one member, or two or more members of these emulsifiers. The acrylic resin is also obtainable by a known suspension polymerization other than emulsion polymerization.

The polymerizable unsaturated monomer for use may be those known so far. For example, reactive-group-containing polymerizable unsaturated monomers and other polymerizable unsaturated monomers may be used.

Examples of reactive groups of reactive-group-containing polymerizable unsaturated monomers include functional groups with reactivity, such as a hydroxy group, an acid group (excluding the carboxyl group and acid anhydride group), a carbonyl group, an N-methylol alkyl ether group, an isocyanate group, an epoxy group, an amino group, an alkoxy silyl group, a carbodiimide group, and a hydrazide group.

Examples of hydroxy-containing polymerizable unsaturated monomers include 2-hydroxyethyl (meth)acrylate, hydroxypropyl (meth)acrylate, 4-hydroxybutyl (meth)acrylate, tetrahydrofurfuryl (meth)acrylate, ε-caprolactone-modified tetrahydrofurfuryl (meth)acrylate, ε-caprolactone-modified hydroxyethyl (meth)acrylate, polyethylene glycol mono(meth)acrylate, polypropylene glycol mono(meth)acrylate, 2-hydroxy-3-phenoxypropyl (meth)acrylate, 2-hydroxy-3-butoxypropyl (meth)acrylate, and phthalic acid monohydroxyethyl (meth)acrylate.

Acid group-containing polymerizable unsaturated monomers include carboxy-containing or acid anhydride group-containing polymerizable unsaturated monomers.

Examples of carboxy-containing or acid anhydride group-containing polymerizable unsaturated monomers include unsaturated carboxylic acids, such as acrylic acid, methacrylic acid, maleic acid, fumaric acid, crotonic acid, itaconic acid, and β-carboxy ethyl acrylate, and acid anhydrides thereof.

Polymerizable unsaturated monomers having an acid group other than the carboxyl group and the acid anhydride group include 2-acrylamide-2-methyl propane sulfonic acid, allylsulfonic acid, sodium styrenesulfonate, sulfoethyl methacrylate, sodium salts thereof, and ammonium salts thereof.

Examples of carbonyl-containing polymerizable unsaturated monomers include acrolein, diacetone acrylamide, diacetone methacrylamide, formylstyrol, and $C_{4-7}$ vinyl alkyl ketone, such as vinyl methyl ketone, vinyl ethyl ketone, and vinyl butyl ketone. Of these, diacetone acrylamide and diacetone methacrylamide are particularly preferable.

Examples of N-methylol alkyl ether group-containing polymerizable unsaturated monomers include N-methylolacrylamide butyl ether.

An isocyanate group-containing polymerizable unsaturated monomer is a compound having at least one unblocked isocyanate group and at least one radically polymerizable double bond per molecule. Examples include methacryloyl isocyanate, 2-isocyanate ethyl methacrylate, m- or p-isopropenyl-α,α'-dimethylbenzyl isocyanate, and an one-to-one (molar ratio) adduct of a hydroxy-containing polymerizable unsaturated monomer and a diisocyanate compound (e.g., an equimolar adduct of 2-hydroxyethyl acrylate and isophorone diisocyanate).

Examples of epoxy group-containing polymerizable unsaturated monomers include glycidyl acrylate, glycidyl methacrylate, CYCLOMER A-200 (an alicyclic epoxy group-containing monomer), and CYCLOMER M-100 (an alicyclic epoxy group-containing monomer).

Examples of amino group-containing polymerizable unsaturated monomers include dimethylaminoethyl acrylate, dimethylaminoethyl methacrylate, diethylaminoethyl acrylate, diethylaminoethyl methacrylate, dimethylaminopropyl acrylamide, and dimethylaminopropyl methacrylamide.

Examples of alkoxy silyl group-containing polymerizable unsaturated monomers include vinyltrimethoxysilane, vinyltriethoxysilane, vinyltripropoxysilane, vinyltributoxysilane, (meth)acryloyloxymethyl trimetoxysilane, (meth)acryloyloxyethyl trimethoxysilane, γ-(meth)acryloyloxypropyl trimethoxysilane, γ-(meth)acryloyloxypropyl triethoxysilane, (meth)acryloyloxyethyl triethoxysilane, (meth)acryloyloxypropyl tributoxysilane, vinyltris-β-methoxyethoxysilane, divinylmethoxysilane, and divinyldi-β-methoxyethoxysilane.

Examples of other polymerizable unsaturated monomers include $C_{1-24}$ alkyl or cycloalkyl esters of (meth)acrylic acid, such as methyl (meth)acrylate, ethyl (meth)acrylate, butyl (meth)acrylate, 2-ethylhexyl (meth)acrylate, lauryl (meth)acrylate, and cyclohexyl (meth)acrylate; $C_{1-16}$ alkoxy alkyl esters of (meth)acrylic acid, such as methoxybutyl acrylate, methoxybutyl methacrylate, methoxyethyl acrylate, methoxyethyl methacrylate, ethoxybutyl acrylate, ethoxybutyl methacrylate, and phenoxyethyl (meth)acrylate; aromatic unsaturated monomers, such as styrene, vinyltoluene, α-methyl styrene, N-vinyl pyrrolidone, and vinyl pyridine; olefins, such as ethylene, propylene, butylene, and pentene; diene compounds, such as butadiene, isoprene, and chloroprene; cyclohexenyl (meth)acrylate, dicyclopentenyl (meth)acrylate, dicyclopentenyloxyethyl (meth)acrylate, isobornyl (meth)acrylate, benzyl (meth)acrylate, N-butoxy (meth)acrylamide, adducts of glycidyl (meth)acrylate and amines, vinyl propionate, vinyl acetate, vinyl pivalate, and VeoVa monomer (produced by Shell Chemicals).

The acrylic resin, when synthesized by solution polymerization, preferably has a weight average molecular weight of 1000 to 200000, and particularly 2000 to 100000, from the standpoint of weatherability, finished appearance, etc.

When the acrylic resin contains hydroxyl groups and has been synthesized by solution polymerization, the hydroxy value is preferably 10 to 250 mgKOH/g, and particularly 30 to 150 mgKOH/g, from the standpoint of coating film curability. When the acrylic resin has been synthesized by emulsion polymerization, the hydroxy value is preferably 5 to 150 mgKOH/g, and particularly 10 to 90 mgKOH/g, from the standpoint of water resistance and curability of the coating film.

When the acrylic resin contains acid groups and has been synthesized by solution polymerization, the acid value is preferably 3 to 150 mgKOH/g, and particularly 5 to 70 mgKOH/g, from the standpoint of dispersion stability in the aqueous coating composition and curability and adhesion of the coating film. When the acrylic resin has been synthesized by emulsion polymerization, the acid value is preferably 0.01 to 100 mgKOH/g, and particularly 0.1 to 75 mgKOH/g from the standpoint of water resistance of the coating film.

When the acrylic resin contains acid groups and is dispersible in water, it is preferable to neutralize the acrylic resin with a neutralizer to make it easy to mix and disperse the resin in water, from the standpoint of improving water dispersibility.

Examples of the neutralizer include hydroxides of alkali metals or alkaline-earth metals, such as sodium hydroxide, potassium hydroxide, lithium hydroxide, calcium hydroxide, and barium hydroxide; ammonia; primary monoamine compounds, such as ethylamine, propylamine, butylamine, cyclohexylamine, monoethanolamine, isopropanolamine, neopentanolamine, 2-aminopropanol, 3-aminopropanol, and 2-amino-2-methylpropanol; secondary monoamine compounds, such as diethylamine, dibutylamine, diethanolamine, dipropylamine, diisopropanolamine, N-methylethanolamine, N-ethylethanolamine, and N-methylisopropanolamine; tertiary monoamine compounds, such as triethylamine, tributylamine, dimethylethanolamine, diethylethanolamine, methyldiethanolamine, dimethylaminoethanol, and triethanolamine; polyamine compounds, such as ethylenediamine, diethylenetriamine, hydroxyethylamino ethylamine, ethylamino ethylamine, and methylamino propyl amine; pyridine; and morpholine.

Of these, primary monoamine compounds, secondary monoamine compounds, tertiary monoamine compounds, and polyamine compounds are preferable for use.

Polyester Resin

The polyester resin can be synthesized by subjecting a polybasic acid and a polyhydric alcohol to esterification by a known method in accordance with an ordinary technique. From the standpoint of water dispersibility, the polyester resin preferably has acid groups, such as carboxyl groups.

The polybasic acid refers to a compound having 2 or more carboxyl groups per molecule, and examples include phthalic acid, isophthalic acid, terephthalic acid, succinic acid, adipic acid, azelaic acid, sebacic acid, naphthalene dicarboxylic acid, 4,4-diphenyldicarboxylic acid, diphenylmethane-4,4'-dicarboxylic acid, HET acid, maleic acid, fumaric acid, itaconic acid, trimellitic acid, pyromellitic acid, cyclohexane-1,3-dicarboxylic acid, cyclohexane-1,4-dicarboxylic acid, hexahydrophthalic acid, hexahydroisophthalic acid, hexahydroterephthalic acid, tetrahydrophthalic acid, hexahydrotrimellitic acid, methylhexahydrophthalic acid, and anhydrides thereof.

The polyhydric alcohol refers to a compound having 2 or more hydroxyl groups per molecule, and examples include glycol compounds, such as ethylene glycol, propylene glycol, diethylene glycol, trimethylene glycol, tetraethylene glycol, triethylene glycol, dipropylene glycol, 1,4-butanediol, 1,3-butanediol, 2,3-butanediol, 1,2-butanediol, 3-methyl-1,2-butanediol, 1,2-pentanediol, 1,5-pentanediol, 1,4-pentanediol, 2,4-pentanediol, 2,3-dimethyltrimethylene glycol, tetramethylene glycol, 3-methyl-4,5-pentanediol, 2,2,4-trimethyl-1,3-pentanediol, 1,6-hexanediol, 1,5-hexanediol, 1,4-hexanediol, 2,5-hexanediol, neopentylglycol, and neopentyl glycol hydroxypivalate; polylactone diol obtained by adding a lactone compound, such as ε-caprolactone, to these glycol compounds; polyester diols, such as bis(hydroxyethyl) terephthalate; 1,3-cyclohexane dimethanol, 1,4-cyclohexane dimethanol, tricyclodecane dimethanol, hydrogenated bisphenol A, hydrogenated bisphenol F, spiroglycol, dihydroxymethyl tricyclodecane, glycerol, trimethylolpropane, trimethylolethane, diglycerol, triglycerol, 1,2,6-hexanetriol, pentaerythritol, dipentaerythritol, dipentaerythritol, sorbitol, mannitol, and hydroxycarboxylic acids, such as 2,2-dimethylolpropionic acid, 2,2-dimethylolbutanoic acid, 2,2-dimethylolpentanoic acid, 2,2-dimethylolhexanoic acid, and 2,2-dimethylolctanoic acid.

Also usable as the polyester resin are fatty-acid-modified polyester resins, which are modified with a fatty acid of (semi-)drying oil, such as linseed oil fatty acid, coconut oil fatty acid, safflower oil fatty acid, soybean oil fatty acid, sesame oil fatty acid, perilla oil fatty acid, hemp oil fatty acid, tall oil fatty acid, dehydrated castor oil fatty acid, etc. It is generally suitable that the proportion of such a modifying fatty acid be not more than 30 wt. % as an oil length. The polyester resin may be one obtained by reacted in part of a monobasic acid, such as benzoic acid.

The polyester resin may also be one obtained by reacting a monoepoxy compound, such as α-olefin epoxide (e.g., propylene oxide and butylene oxide) and Cardura E10 (produced by Japan Epoxy Resin Co., Ltd., trade name, a glycidyl ester of a synthetic, highly branched, saturated fatty acid), with acid groups of a polyester resin.

When carboxyl groups are introduced into a polyester resin, carboxyl groups can be introduced, for example, by adding an acid anhydride to a hydroxy-containing polyester and performing half-esterification.

When the polyester resin has hydroxyl groups, the hydroxy value is preferably 10 to 250 mgKOH/g, and particularly 40 to 170 mgKOH/g, from the standpoint of water resistance and curability of the coating film.

When the polyester resin has acid groups, the acid value is preferably 5 to 100 mgKOH/g, and particularly 10 to 60 mgKOH/g, from the standpoint of water resistance and adhesion of the coating film.

The polyester resin preferably has a number average molecular weight of 1000 to 100000, and particularly 1000 to 50000, from the standpoint of water resistance and curability of the coating film.

When the polyester resin has acid groups and is dispersible in water, it is preferable to neutralize the polyester resin with a neutralizer to make it easy to mix and disperse the resin in water, from the standpoint of improving water dispersibility.

The neutralizer for use may be the same as those examples listed for the acrylic resin.

Crosslinking Agent (C)

The aqueous resin composition of the present invention may further contain a crosslinking agent (C). The crosslinking agent (C) is not particularly limited, and usable is a crosslinking agent that is reactive with crosslinking-reactive groups of the acrylic-modified polyester resin (A) if the resin (A) has crosslinking-reactive groups, and reactive groups of the reactive-group-containing resin (B).

Specific examples of the crosslinking agent (C) include amino resins, polyisocyanate compounds, polyhydrazide compounds, polysemicarbazide compound, carbodiimide group-containing compounds, oxazoline group-containing compounds, epoxy compounds, and polycarboxylic acids. The crosslinking agent may be used singly or in a combination of two or more.

The amino resins for use include partially or fully methylolated amino resins obtained by reacting an amino component with an aldehyde component. Examples of the amino component include melamine, urea, benzoguanamine, acetoguanamine, steroguanamine, spiroguanamine, and dicyandiamide. Examples of the aldehyde component include formaldehyde, paraformaldehyde, acetaldehyde, and benzaldehyde.

Also usable are those obtained by etherifying some or all of the methylol groups of the methylolated amino resins listed above with a suitable alcohol. Examples of the alcohol usable for etherification include methyl alcohol, ethyl alcohol, n-propyl alcohol, i-propyl alcohol, n-butyl alcohol, i-butyl alcohol, 2-ethyl-1-butanol, and 2-ethyl-1-hexanol.

The amino resin is preferably a melamine resin, and particularly preferably a methyl-etherified melamine resin obtained by etherifying some or all of the methylol groups of a partially or fully methylolated melamine resin with methyl alcohol; a butyl-etherified melamine resin obtained by etherifying some or all of the methylol groups of a partially or fully methylolated melamine resin with butyl alcohol; and a methyl-butyl mixed etherified melamine resin obtained by etherifying some or all of the methylol groups of a partially or fully methylolated melamine resin with methyl alcohol and butyl alcohol, with the methyl-butyl mixed etherified melamine resin being more preferable.

The melamine resin preferably has a weight average molecular weight of 400 to 6,000, more preferably 500 to 4,000, and still more preferably 600 to 3,000.

The melamine resin for use may be a commercially available product. Examples of commercially available products include Cymel 202, Cymel 203, Cymel 204, Cymel 211, Cymel 212, Cymel 238, Cymel 251, Cymel 253, Cymel 254, Cymel 303, Cymel 323, Cymel 324, Cymel 325, Cymel 327, Cymel 350, Cymel 370, Cymel 380, Cymel 385, Cymel 1156, Cymel 1158, Cymel 1116, and Cymel 1130 (all produced by Nihon Cytec Industries Inc.); Resimene 735, Resimene 740, Resimene 741, Resimene 745, Resimene 746, and Resimene 747 (all produced by Monsanto Co., Ltd.); U-Van 120, U-Van 20HS, U-Van 20SE, U-Van 2021, U-Van 2028, and U-Van 28-60 (all produced by Mitsui Chemicals, Inc.); and SUMIMAL M55, SUMIMAL M30W, and SUMIMAL M50W (all produced by Sumitomo Chemical Co., Ltd.).

When a melamine resin is used for the crosslinking agent (C), a sulfonic acid, such as paratoluenesulfonic acid, dodecylbenzenesulfonic acid, and dinonylnaphthalene sulfonic acid; a neutralization salt of these sulfonic acids with an amine; or a neutralization salt of a phosphoric ester compound with an amine may be used as a curing catalyst.

The polyisocyanate compound is a compound having 2 or more isocyanate groups per molecule.

Specific examples of the polyisocyanate compound include aliphatic polyisocyanates, alicyclic polyisocyanates, aromatic-aliphatic polyisocyanates, aromatic polyisocyanates, and derivatives of these polyisocyanates.

Examples of aliphatic polyisocyanates include aliphatic diisocyanates, such as trimethylene diisocyanate, tetramethylene diisocyanate, hexamethylene diisocyanate, pentamethylene diisocyanate, 1,2-propylene diisocyanate, 1,2-butylene diisocyanate, 2,3-butylene diisocyanate, 1,3-butylene diisocyanate, 2,4,4- or 2,2,4-trimethylhexamethylene diisocyanate, and 2,6-diisocyanatcmethyl caproate; and aliphatic triisocyanates, such as lysine ester triisocyanate, 1,4,8-triisocyanateoctane, 1,6,11-triisocyanateundecane, 1,8-diisocyanato-4-isocyanatomethyloctane, 1,3,6-triisocyanatehexane, and 2,5,7-trimethyl-1,8-diisocyanato-5-isocyanatomethyloctane.

Examples of alicyclic polyisocyanates include alicyclic diisocyanates, such as 1,3-cyclopentene diisocyanate, 1,4-cyclohexane diisocyanate, 1,3-cyclohexane diisocyanate, 3-isocyanatomethyl-3,5,5-trimethylcyclohexyl isocyanate (common name: isophorone diisocyanate), 4,4'-methylenebis(cyclohexyl isocyanate), methyl-2,4-cyclohexane diisocyanate, methyl-2,6-cyclohexane diisocyanate, 1,3- or 1,4-bis(isocyanatomethyl)cyclohexane (common name: hydrogenated xylylene diisocyanate) or mixtures thereof, and norbornane diisocyanate; and alicyclic triisocyanates, such as 1,3,5-triisocyanatecyclohexane, 1,3,5-trimethylisocyanatocyclohexane, 2-(3-isocyanatopropyl)-2,5-di(isocyanatomethyl)-bicyclo(2.2.1)heptane, 2-(3-isocyanatopropyl)-2,6-di(isocyanatomethyl)-bicyclo(2.2.1)heptane, 3-(3-isocyanatopropyl)-2,5-di(isocyanatomethyl)-bicyclo(2.2.1) heptane, 5-(2-isocyanatoethyl)-2-isocyanatomethyl-3-(3-isocyanatopropyl)-bicyclo(2.2.1)heptane, 6-(2-isocyanatoethyl)-2-isocyanatomethyl-3-(3-isocyanatopropyl)-bicyclo(2.2.1) heptane, 5-(2-isocyanatoethyl)-2-isocyanatomethyl-2-(3-isocyanatopropyl)-bicyclo(2.2.1)heptane, and 6-(2-isocyanatoethyl)-2-isocyanatomethyl-2-(3-isocyanatopropyl)-bicyclo(2.2.1) heptane.

Examples of aromatic-aliphatic polyisocyanates include aromatic-aliphatic diisocyanates, such as 1,3- or 1,4-xylylene diisocyanate or mixtures thereof, ω,ω'-diisocyanato-1,4-diethylbenzene, and 1,3- or 1,4-bis(1-isocyanato-1-methylethyl)benzene (common name: tetramethylxylylene diisocyanate) or mixtures thereof; and aramatic-aliphatic triisocyanates, such as 1,3,5-triisocyanatomethylbenzene.

Examples of aromatic polyisocyanates include aromatic diisocyanates, such as m-phenylene diisocyanate, p-phenylene diisocyanate, 4,4'-diphenyl diisocyanate, 1,5-naphthalene diisocyanate, 2,4'- or 4,4'-diphenylmethane diisocyanate or mixtures thereof, 2,4- or 2,6-tolylene diisocyanate or mixtures thereof, 4,4'-toluidine diisocyanate, and 4,4'-diphenylether diisocyanate; aromatic triisocyanates, such as triphenylmethane-4,4',4"-triisocyanate, 1,3,5-triisocyanatobenzene, and 2,4,6-triisocyanatotoluene; and aromatic tetraisocyanates, such as diphenylmethane-2,2',5,5'-tetraisocyanate.

Examples of polyisocyanate derivatives include dimers, trimers, biurets, allophanates, carbodiimides, uretdiones, uretoimines, isocyanurates, oxadiazinetriones, polymethylene polyphenyl polyisocyanates (crude MDI, polymeric MDI), and crude TDI of polyisocyanate compounds stated above.

Usable polyisocyanate compounds also include blocked polyisocyanate compounds obtained by blocking free isocyanate groups of polyisocyanate compounds with a blocking agent. When a blocked polyisocyanate compound is heated to, for example, 100° C. or more, preferably 130° C. or more, the isocyanate groups are regenerated and can readily react with reactive groups.

Examples of such blocking agents include phenol-based blocking agents, such as phenol, cresol, xylenol, nitrophenol, ethylphenol, hydroxydiphenyl, butylphenol, isopropylphenol, nonylphenol, octylphenol, and hydroxymethyl benzoate; lactam-based blocking agents, such as ε-caprolactam, δ-valerolactam, γ-butyrolactam, and β-propiolactam; aliphatic alcohol-based blocking agents, such as methanol, ethanol, propyl alcohol, butyl alcohol, amyl alcohol, and lauryl alcohol; ether-based blocking agents, such as ethylene glycol monomethyl ether, ethylene glycol monoethyl ether, ethylene glycol monobutyl ether, diethylene glycol monomethyl ether, diethylene glycol monoethyl ether, propylene glycol monamethyl ether, and methoxymethanol; benzyl alcohol; glycolic acid; glycolates, such as methyl glycolate, ethyl glycolate, and butyl glycolate; lactic acid; lactates, such as methyl lactate, ethyl lactate, and butyl lactate; alcohol-based blocking agents, such as methylol urea, methylol melamine, diacetone alcohol, 2-hydroxyethyl acrylate, and 2-hydroxyethyl methacrylate; oxime-based blocking agents, such as formamidoxime, acetamidooxime, acetoxime, methylethylketoxime, diacetyl monoxime, benzophenone oxime, and cyclohexaneoxime; active-methylene-based blocking agents, such as dimethyl malonate, diethyl malonate, ethyl acetoacetate, methyl acetoacetate, and acetylacetone; mercaptan-based blocking agents, such as butyl mercaptan, t-butyl mercaptan, hexyl mercaptan, t-dodecyl mercaptan, 2-mercaptobenzothiazole, thiophenol, methylthiophenol, and ethylthiophenol; acid amide-based blocking agents, such as acetanilide, acetanisidide, acetotoluide, acrylamide, methacrylamide, acetamide, stearamide, and benzamide; imide-based blocking agents, such as succinimide, phthalimide, and maleimide; amine-based blocking agents, such as diphenylamine, phenylnaphthylamine, xylidine, N-phenylxylidine, carbazole, aniline, naphthylamine, butylamine, dibutylamine, and butylphenylamine; imidazole-based blocking agents, such as imidazole and 2-ethylimidazole; pyrazole-based blocking agents, such as 3,5-dimethylpyrazole; urea-based blocking agents, such as urea, thiourea, ethylene urea, ethylene thiourea, and diphenylurea; carbamate-based blocking agents, such as phenyl N-phenylcarbamate; imine-based blocking agents, such as ethyleneimine and propyleneimine; sulfite salt-based blocking agents, such as sodium bisulfite and potassium bisulfite; and other blocking agents.

When a polyisocyanate compound is used for the crosslinking agent (C), an organic tin compound, for example, may be used as a curing catalyst.

A polyisocyanate compound can be used as a crosslinking agent, for example, for resins containing hydroxyl or amino groups.

The polyhydrazide compound is a compound having 2 or more hydrazide groups per molecule.

Examples of polyhydrazide compounds include saturated aliphatic carboxylic acid dihydrazides having 2 to 18 carbon atoms, such as oxalic acid dihydrazide, malonic acid dihydrazide, succinic acid dihydrazide, glutaric acid dihydrazide, adipic acid dihydrazide, and sebacic acid dihydrazide; dihydrazides of monoolefinic unsaturated dicarboxylic acids, such as maleic acid dihydrazide, fumaric acid dihydrazide, and itaconic acid dihydrazide; polyhydrazides of carbonic acids, such as carbonic acid dihydrazide; polyhydrazides of aromatic polycarboxylic acids, such as dihydrazides of phthalic acid, terephthalic acid, or isophthalic acid, and dihydrazide, trihydrazide, or tetrahydrazide of pyromellitic acid; aliphatic trihydrazides, such as nitrilotriacetic acid trihydrazide, citric acid trihydrazide, and 1,2,4-benzene trihydrazide; tetrahydrazides, such as ethylenediaminetetraacetic acid tetrahydrazide and 1,4,5,8-naphthoic acid tetrahydrazide; and polyhydrazides obtained by reacting a low polymer having a carboxylic-acid-lower-alkyl-ester group with a hydrazine or a hydrazine hydrate (see JPS52-22878B).

A polyhydrazide compound with overly high hydrophobicity is difficult to disperse in water, and a uniform crosslinked coating film cannot be obtained. It is thus preferable to use a compound with moderate hydrophilicity and a relatively low molecular weight (about 300 or less). Examples of such polyhydrazide compounds include dihydrazide compounds of $C_{4-12}$ dicarboxylic acids, such as succinic acid dihydrazide, glutaric acid dihydrazide, adipic acid dihydrazide, and sebacic acid dihydrazide.

A polyhydrazide compound can be used as a crosslinking agent, for example, for resins containing carbonyl groups.

The polysemicarbazide compound refers to a compound having 2 or more semicarbazide groups per molecule.

Examples of polysemicarbazide compounds include aliphatic, alicyclic, or aromatic bissemicarbazides; polyfunctional semicarbazides obtained by reacting diisocyanates, such as hexamethylene diisocyanate or isophorone diisocyanate, or polyisocyanate compounds derived therefrom, with excess N,N-substituted hydrazines, such as N,N-dimethylhydrazine, and/or hydrazides mentioned above; aqueous polyfunctional semicarbazides obtained by reacting isocyanate groups of a reaction product of polyisocyanate compounds listed above, polyethers, and active hydrogen compounds containing hydrophilic groups, such as polyols or polyethylene glycol monoalkyl ethers, with excess dihydrazides listed above (see, for example, JPH08-151358A); compounds having semicarbazide groups, such as mixtures of polyfunctional semicarbazides listed above and aqueous polyfunctional semicarbazides listed above; and compounds having hydrazone groups, such as bisacetyl dihydrazone.

A polysemicarbazide compound can be used as a crosslinking agent, for example, for resins containing carbonyl groups.

Carbodiimide group-containing compounds are obtained, for example, by allowing isocyanate groups of a polyisocyanate compound to react with each other to remove carbon dioxide.

Examples of commercially available products include Carbodilite V-02, Carbodilite V-02-L2, Carbodilite V-04, Carbodilite E-01, and Carbodilite E-02 (trade names, all produced by Nisshinbo Industries, Inc.).

A carbodiimide group-containing compound can be used as a crosslinking agent, for example, for resins containing carboxyl groups.

Examples of oxazoline group-containing compounds include (co)polymers obtained by copolymerizing a polymer having oxazoline groups, such as polymerizable unsaturated monomers having oxazoline groups, optionally with another polymerizable unsaturated monomer by a known method (e.g., solution polymerization or emulsion polymerization).

Examples of polymerizable unsaturated monomers having oxazoline groups include 2-vinyl-2-oxazoline, 2-vinyl- 4-methyl-2-oxazoline, 2-vinyl-5-methyl-2-oxazoline, 2-isopropenyl-2-oxazoline, 2-isopropenyl-4-methyl-2-oxazoline, and 2-isopropenyl-5-ethyl-2-oxazoline.

Examples of other polymerizable unsaturated monomers include $C_{1-24}$ alkyl or cycloalkyl esters of (meth)acrylic acid, such as methyl (meth)acrylate, ethyl (meth)acrylate, propyl (meth)acrylate, butyl (meth)acrylate, 2-ethylhexyl (meth)acrylate, cyclohexyl (meth)acrylate, lauryl (meth)acrylate, and isobornyl (meth)acrylate; $C_{2-8}$ hydroxyalkyl esters of (meth)acrylic acid, such as 2-hydroxyethyl (meth)acrylate and hydroxypropyl (meth)acrylate; vinyl aromatic compounds, such as styrene and vinyl toluene; adducts of (meth)acrylamide, dimethylaminopropyl (meth)acrylamide, dimethylaminoethyl (meth)acrylate, or glycidyl (meth)acrylate with amines; polyethylene glycol (meth)acrylate; and N-vinyl pyrrolidone, ethylene, butadiene, chloroprene, vinyl propionate, vinyl acetate, and (meth)acrylonitrile. These can be suitably selected singly or in a combination of two or more.

An oxazoline group-containing compound can be used as a crosslinking agent, for example, for resins containing carboxyl groups.

The epoxy compound refers to a compound having 2 or more epoxy groups per molecule. Specific examples include diepoxy compounds, such as bis(3,4-epoxycyclohexylmethyl) adipate, and epoxy group-containing acrylic resins.

An epoxy compound can be used as a crosslinking agent, for example, for resins containing acid groups or amino groups.

Examples of polycarboxylic acids include aliphatic polybasic acids, such as adipic acid, azelaic acid, sebacic acid, 1,4-cyclohexanedicarboxylic acid, 1,2-cyclohexanedicarboxylic acid, 1,2,4-butanetricarboxylic acid, and 1,2,3,4-butanetetracarboxylic acid; aromatic polybasic acids, such as phthalic acid, isophthalic acid, terephthalic acid, and trimellitic acid; half-esters produced by addition reaction of a polyol and 1,2-acid anhydride; addition reaction products of polyepoxide and 1,2-acid anhydride in an amount of 2 equivalents or more relative to the epoxy groups of the polyepoxide; carboxy-containing acrylic polymers; acrylic polymers having groups obtained by half-esterification of acid anhydride groups; and carboxy-containing polyester polymers.

A polycarboxylic acid can be used as a crosslinking agent, for example, for epoxy group-containing or carbodiimide group-containing resins.

Aqueous Coating Composition

The amounts of the acrylic-modified polyester resin (A) (component (A)), the reactive-group-containing resin (B) (component (B)), and the optional crosslinking agent (C) (component (C)) in the aqueous coating composition of the present invention are as follows: it is suitable that based on the total resin solids content of the components (A), (B), and (C), the proportion of the acrylic-modified polyester resin (A) is 1 to 50 mass %, preferably 1 to 40 mass %, and still preferably 3 to 30 mass %; the proportion of the reactive-group-containing resin (B) is 1 to 99 mass %, preferably 1 to 90 mass %, and still preferably 5 to 80 mass %; and the proportion of the crosslinking agent (C) is 0 to 60 mass %, preferably 0 to 40 mass %, and still preferably 0 to 30 mass %.

For the aqueous coating composition of the present invention, a pigment may optionally be used. Examples of pigments include color pigments, such as titanium oxide, zinc white, carbon black, phthalocyanine blue, Prussian blue, cobalt blue, azo pigments, phthalocyanine pigments, quinacridone pigments, isoindoline pigments, threne pigments, and perylene pigments; extender pigments, such as talc, clay, kaolin, baryta, barium sulfate, barium carbonate, calcium carbonate, silica, and alumina white; and effect pigments, such as aluminum powder, mica powder, and mica powder coated with titanium oxide.

A suitable amount of the pigment is typically 0 to 250 mass %, and particularly 3 to 150 mass %, based on the total resin solids content of the components (A) and (B), and the optionally added component (C).

For the aqueous coating composition of the present invention, optionally, a curing catalyst, a dispersant, an anti-settling agent, an organic solvent, an antifoaming agent, a thickener, an ultraviolet absorber, a light stabilizer, a surface control agent, etc. may be suitably used.

The solvent of the aqueous coating composition of the present invention is largely composed of water.

The aqueous coating composition of the present invention provides a coating film excellent in film performance (e.g., chipping resistance) and finished appearance (e.g., coated surface smoothness), and also excellent in storage stability. Thus, the aqueous coating composition is suitable for use, for example, in building materials, construction, and automobiles.

Coating with the aqueous coating composition of the present invention can be performed by a known method, such as roll coating, air-spray coating, airless spray coating, rotary atomization coating, and curtain coating. These coating methods may optionally be performed with application of electrostatic charge. A coating method may be performed one time or multiple times until a desired film thickness is achieved. The film thickness is preferably 3 to 100 μm, and particularly 5 to 60 μm, on a cured coating film basis. The coating film can be cured by optionally heating it, for example, at a temperature from room temperature to 170° C. Curing with heating can be performed with a known heating means, for example, a drying furnace, such as a hot-air furnace, an electric furnace, and an electromagnetic induction furnace. Before performing curing with heating, preheating may optionally be performed at a temperature of about 50 to 80° C. for about 3 to 10 minutes to facilitate the volatilization of volatile components, such as the solvent.

The substrate to be coated is not particularly limited. Preferable examples include steel plates, such as cold-rolled steel plates, galvanized steel plates, zinc-alloy-plated steel plates, stainless-steel plates, and tin-plated steel plates metal materials, such as aluminum plates, and aluminum alloy plates; resins, such as polyethylene resin, polypropylene resin, acrylonitrile-butadiene-styrene (ABS) resin, polyamide resin, acrylic resin, vinylidene chloride resin, polycarbonate resin, polyurethane resin, and epoxy resin; plastic materials, such as various types of FRP; and concrete surfaces, mortar surfaces, corrugated walls, roof tiles, PC plates, ALC plates, cement, calcium silicate cement plates, pottery and porcelain, tiles, glass, wood, stone materials, and coating film surface. Of these, metal materials and plastic materials are preferable.

The substrate may also be bodies of various vehicles, such as automobiles, two-wheel vehicles, and containers, and building materials, formed by the items listed above.

The substrate may also be those obtained by subjecting the metallic surface of a metal substrate or a vehicle body as stated above to surface treatment, such as phosphate treatment, chromate treatment, or composite oxide treatment.

These substrates may be subjected to undercoating (e.g., cationic electrodeposition coating) beforehand and, if required, intermediate coating as well.

These substrates may further have a coating film, for example, formed of a pigment coating composition on the surface of the intermediate coating film.

The aqueous coating composition of the present invention, when used, may be diluted with water and/or an organic solvent etc., if necessary, to adjust it to a suitable viscosity for coating.

The suitable viscosity varies depending on the formulation of the coating composition, and is typically about 1000 to 7000 mPa·s, and preferably about 2000 to 5000 mPa·s as measured, for example, at 20° C. with a six-speed rotational B-type viscometer.

In the embodiments above, the coating solids concentration of the present coating composition is typically about 5 to 70 mass %, and preferably about 10 to 50 mass %.

EXAMPLES

The following describes the present invention in more detail with reference to Examples and Comparative Examples. However, the present invention is not limited only to these Examples. "Parts" and "%" are both expressed on a mass basis.

Production of Acrylic-modified Polyester Resin (A)

Production Example 1

19.0 parts of isophthalic acid, 32.4 parts of adipic acid, 0.7 parts of maleic anhydride, and 45.1 parts of 1,6-hexanediol were placed in a reactor equipped with a thermometer, a thermostat, a stirrer, a heating device, and a rectifying column, and the temperature was increased to 160° C. with stirring. Subsequently, the temperature of the content was gradually increased from 160° C. to 230° C. over 3.5 hours, and the generated condensed water was distilled off through the rectifying column. After the reaction was continued at 230° C. for 90 minutes, the rectifying column was replaced with a water separator, and about 4 parts of toluene was added to the content, followed by azeotropy of water and toluene to remove condensed water. One hour after addition of toluene, measurement of the acid value was started, and heating was ended after the acid value was confirmed to have reached less than 6. Toluene was then removed under reduced pressure, and 20 parts of dipropylene glycol monomethyl ether was added thereto for dilution, followed by addition of 2.1 parts of methoxy polyethylene glycol methacrylate (Mw 1000).

The reaction mixture was cooled to 130° C., and a mixture of 3 parts of styrene, 3.3 parts of acrylic acid, 6.6 parts of n-butyl acrylate, and 0.75 parts of t-butylperoxy-2-ethylhexanoate was added dropwise thereto over 30 minutes. Thereafter, the mixture was aged at 130° C. for 30 minutes, and 0.05 parts of t-butylperoxy-2-ethylhexanoate was added as an additional catalyst, followed by further aging for 1 hour.

The reaction mixture was then cooled to 85° C., and neutralized with dimethylethanolamine, followed by addition of deionized water to disperse the mixture in water, thereby obtaining an aqueous dispersion of acrylic-modified polyester resin (A1) with a solids content of 40%. The obtained acrylic-modified polyester resin (A1) had an acid value of 30 mgKOH/g, a hydroxy value of 47 mgKOH/g, and a number average molecular weight of 3000 (number average molecular weight of the polyester part: 1850).

Production Examples 2 to 19 and 21

Aqueous dispersions of acrylic-modified polyester resins (A2) to (A19) and (A21) were obtained in the same manner as in Production Example 1, except that the formulation was changed as shown in Table 1.

Production Example 20

22.3 parts of trimethylolpropane, 12.9 parts of neopentylglycol, 19.6 parts of 2-butyl-2-ethyl-1,3-propanediol, 19.1 parts of adipic acid, and 33.9 parts of isophthalic acid were placed in a reactor equipped with a thermometer, a thermostat, a stirrer, a reflux condenser, and a water separator, and the temperature was increased to 160° C. with stirring. Subsequently, the temperature of the content was gradually increased from 160° C. to 230° C. over 3.5 hours, and the generated condensed water was distilled off through the rectifying column. After the reaction was continued at 230° C. for 90 minutes, the rectifying column was replaced with a water separator, and about 4 parts of toluene was added to the content, followed by azeotropy of water and toluene to remove condensed water. One hour after addition of toluene, measurement of the acid value was started, and heating was ended after the acid value was confirmed to have reached less than 6. After toluene was removed under reduced pressure, the content was cooled to 170° C. Thereafter, 4.3 parts of trimellitic anhydride was added, and addition reaction was performed at 170° C. for 30 minutes, followed by addition of 20 parts of dipropylene glycol monomethyl ether for dilution.

The obtained diluted solution was cooled to 85° C., and neutralized with dimethylethanolamine, followed by addition of deionized water to disperse the mixture in water, thereby obtaining an aqueous dispersion of polyester resin (A20) with a solids content of 40%. The obtained polyester resin (A20) had an acid value of 30 mgKOH/g, a hydroxy value of 167 mgKOH/g, and a number average molecular weight of 1200.

Table 1 shows characteristic values of the obtained aqueous dispersions of acrylic-modified polyester resin (A). In Table 1, "PE/Ac Ratio" indicates mass % of the acrylic part (Ac) and mass % of the polyester part (PE) of the total amount of the acrylic part and the polyester part in the acrylic-modified polyester resin (A).

Under "Polyester Characteristic Value," Table 1 also shows the number average molecular weight, acid value, and hydroxy value of the polyester part of each acrylic-modified polyester resin (A), and the proportion of the one or more compounds having 6 or more carbon atoms of the components constituting the polyester part (in Table 1, "Proportion of C6 or more (%)"). Table 1 also shows the acid value and hydroxy value of the acrylic part of each acrylic-modified polyester resin (A) under "Acrylic Characteristic Value."

The aqueous dispersions of acrylic-modified polyester resins (A18), (A19), and (A21) are for Comparative Examples.

The aqueous dispersion of polyester resin (A20) is for Comparative Examples. Polyester resin (A20) is shown as A20 in the acrylic-modified polyester resin (A) row of the following Tables 1 to 5 for convenience.

TABLE 1

| | | | Production Example |||||||||||||||||||||
|---|---|---|---|---|---|---|---|---|---|---|---|---|---|---|---|---|---|---|---|---|---|
| | | | 1 | 2 | 3 | 4 | 5 | 6 | 7 | 8 | 9 | 10 | 11 | 12 | 13 | 14 | 15 | 16 | 17 | 18 | 19 | 20 | 21 |
| | | | Acrylic-modified Polyester Resin (A) |||||||||||||||||||||
| | | | A1 | A2 | A3 | A4 | A5 | A6 | A7 | A8 | A9 | A10 | A11 | A12 | A13 | A14 | A15 | A16 | A17 | A18 | A19 | A20 | A21 |
| Polyester Part | Acid Component | C6 or more Isophthalic Acid | 19.0 | 19.0 | 19.0 | 19.0 | 19.0 | 19.0 | 19.0 | 19.0 | 19.0 | 19.0 | 19.6 | 20.2 | 19.5 | 16.2 | 18.9 | 19.2 | 17.9 | 19.0 | 19.0 | 33.9 | 20.5 |
| | | Less than C6 Adipic Acid | 32.4 | 32.4 | 23.4 | 32.4 | 32.4 | 32.4 | 32.4 | 32.4 | 32.4 | 32.4 | 33.3 | 34.4 | | 9.5 | 32.1 | 31.6 | 30.5 | 32.4 | 32.4 | 19.1 | 16.8 |
| | | Succinic Anhydride | | | | | | | | | | | | | 22.8 | 12.4 | | | | | | | 12.4 |
| | | Maleic Anhydride | 0.7 | 0.7 | 0.7 | 0.7 | 0.7 | 0.7 | 0.7 | 0.7 | 0.7 | 0.7 | 0.8 | 0.8 | 0.8 | 0.6 | 0.7 | 0.8 | 0.7 | 0.7 | 0.7 | | 0.8 |
| | Alcohol Component | C6 or more 1,6-Hexanediol | 45.1 | 45.1 | 45.1 | 45.1 | 45.1 | 45.1 | 45.1 | 45.1 | 45.1 | 45.1 | 23.2 | 0.0 | 46.3 | | 40.3 | 45.5 | 42.4 | 45.1 | 45.1 | | |
| | | 2-Butyl-2-ethyl-1,3-propanediol | | | | | | | | | | | | | | 52.2 | | | | | | 19.6 | |
| | | Trimethylolpropane | | | | | | | | | | | 20.7 | | | | | | | | | 22.3 | |
| | Less than C6 | Neopentylglycol | | | | | | | | | | | | 42.6 | | | 5.2 | | | | | 12.9 | 43.2 |
| | Added Acid | Trimellitic Anhydride | | | | | | | | | | | | | | | | | | | | 4.3 | |
| Polyester Characteristic Value | | Number Average Molecular Weight | 1850 | 1850 | 1850 | 1850 | 1850 | 1850 | 1850 | 1850 | 1850 | 1850 | 1800 | 1750 | 1800 | 2000 | 1850 | 1600 | 1850 | 1850 | 1850 | 1200 | 1700 |
| | | Acid Value (mgKOH/g) | 5 | 5 | 5 | 5 | 5 | 5 | 5 | 5 | 5 | 5 | 5 | 5 | 5 | 5 | 5 | 5 | 5 | 5 | 5 | 30 | 5 |
| | | Hydroxy Value (mgKOH/g) | 55 | 55 | 55 | 55 | 55 | 55 | 55 | 55 | 55 | 55 | 57 | 59 | 57 | 48 | 80 | 66 | 55 | 55 | 55 | 167 | 59 |
| | | Proportion of C6 or more (%) | 99.2% | 99.2% | 99.2% | 99.2% | 99.2% | 99.2% | 99.2% | 99.2% | 99.2% | 99.2% | 78.0% | 55.7% | 73.7% | 85.7% | 99.2% | 99.2% | 99.2% | 99.2% | 99.2% | 84.7% | 39.8% |
| Acrylic Part | Polymerizable Unsaturated Monomer | Aromatic-ring-containing Styrene | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 3.0 | 4.0 | 3.0 | 3.0 | 3.0 | 3.0 |
| | | Carboxyl-group-containing Acrylic Acid | 3.3 | 3.3 | 3.3 | 3.3 | 3.3 | 3.3 | 4.1 | 3.3 | 3.3 | 3.3 | 3.3 | 3.3 | 3.3 | 3.3 | 3.3 | 3.3 | 3.4 | 3.3 | 3.3 | 3.3 | 3.3 |
| | | OH-group-containing Hydroxyethyl Methacrylate | | 2.1 | | | | | | | | | | | | | | | | | | | |
| | | Others 2-Ethylhexyl Acrylate | | | | | | | | 1.5 | | 6.6 | | | | | | | | | | | |
| | | n-Butyl Acrylate | 6.6 | 6.6 | 6.6 | 5.6 | 4.5 | 6.6 | 5.9 | 5.1 | 6.6 | 0.0 | 6.6 | 6.6 | 6.6 | 6.6 | 6.6 | 6.6 | 9.8 | 6.6 | 8.7 | 6.6 | 6.6 |
| | Polyoxyalkylene group-containing | Methoxy Polyethylene Glycol Methacrylate (Mw 200) | | | | | | | | | | | | | | | | | | 2.1 | | | |
| | | Methoxy Polyethylene Glycol Methacrylate (Mw 400) | | | | 3.2 | 4.2 | | 2.1 | 2.1 | 2.1 | 2.1 | 2.1 | 2.1 | 2.1 | 2.1 | 2.1 | 2.1 | 2.8 | | | | 2.1 |
| | | Methoxy Polyethylene Glycol Methacrylate (Mw 1000) | 2.1 | | | | | | | | | | | | | | | | | | 0.0 | 2.1 | |

TABLE 1-continued

| | | Production Example | | | | | | | | | | | | | | | | | | | | |
|---|---|---|---|---|---|---|---|---|---|---|---|---|---|---|---|---|---|---|---|---|---|---|
| | | 1 | 2 | 3 | 4 | 5 | 6 | 7 | 8 | 9 | 10 | 11 | 12 | 13 | 14 | 15 | 16 | 17 | 18 | 19 | 20 | 21 |
| | | Acrylic-modified Polyester Resin (A) | | | | | | | | | | | | | | | | | | | | |
| | | A1 | A2 | A3 | A4 | A5 | A6 | A7 | A8 | A9 | A10 | A11 | A12 | A13 | A14 | A15 | A16 | A17 | A18 | A19 | A20 | A21 |
| | Methoxy Polyethylene Glycol Methacrylate (Mw 4000) | | | 2.1 | | | | | | | | | | | | | | | | | | |
| | Polyethylene Glycol Monoacrylate (Mw 400) | | | | | | 2.1 | | | | | | | | | | | | | | | |
| Initiator | t-Butylperoxy-2-Ethylhexanoate | 0.75 | 0.75 | 0.75 | 0.75 | 0.75 | 0.75 | 0.75 | 0.75 | 1.5 | 0.8 | 0.8 | 0.8 | 0.8 | 0.8 | 0.8 | 0.8 | 1.0 | 0.8 | 0.8 | | 0.8 |
| Acrylic Characteristic Value | Acid Value (mgKOH/g) | 171 | 171 | 171 | 171 | 171 | 171 | 210 | 171 | 171 | 171 | 171 | 171 | 171 | 171 | 171 | 171 | 132 | 171 | 171 | | 171 |
| | Hydroxy Value (mgKOH/g) | 0 | 0 | 0 | 0 | 0 | 20 | 0 | 43 | 0 | 0 | 0 | 0 | 0 | 0 | 0 | 0 | 0 | 0 | 0 | | 0 |
| Characteristic Value | Number Average Molecular Weight | 3000 | 3000 | 3000 | 3000 | 3000 | 3000 | 3000 | 3000 | 2800 | 3000 | 3000 | 3000 | 3000 | 3000 | 3000 | 3000 | 3200 | 3000 | 3000 | 1200 | 3000 |
| | Acid Value (mgKOH/g) | 30 | 30 | 30 | 30 | 30 | 30 | 36 | 30 | 30 | 30 | 30 | 30 | 30 | 30 | 30 | 30 | 30 | 30 | 30 | 30 | 30 |
| | Hydroxy Value (mgKOH/g) | 47 | 47 | 47 | 47 | 47 | 50 | 47 | 54 | 47 | 47 | 48 | 50 | 48 | 41 | 68 | 56 | 44 | 47 | 47 | 167 | 50 |
| | PE/Ac ratio PE | 85 | 85 | 85 | 85 | 85 | 85 | 85 | 85 | 85 | 85 | 85 | 85 | 85 | 85 | 85 | 85 | 80 | 85 | 85 | 100 | 85 |
| | wt Ac | 15 | 15 | 15 | 15 | 15 | 15 | 15 | 15 | 15 | 15 | 15 | 15 | 15 | 15 | 15 | 15 | 20 | 15 | 15 | 0 | 15 |

Production of Reactive-Group-Containing Resin (B)

Production of Hydroxy-Containing Polyester Resin (B1)

Production Example 22

174 parts of trimethylolpropane, 327 parts of neopentylglycol, 352 parts of adipic acid, 109 parts of isophthalic acid, and 101 parts of 1,2-cyclohexanedicarboxylic anhydride were placed in a reactor equipped with a thermometer, a thermostat, a stirrer, a reflux condenser, and a water separator, and the temperature was increased from 160° to 230° C. over 3 hours. Thereafter, the temperature was maintained at 230° C., while the generated condensed water was distilled off with a water separator, to allow the reaction to proceed until the acid value reached 3 mgKOH/g or less. 59 parts of trimellitic anhydride was added to this reaction product, and addition reaction was performed at 170° C. for 30 minutes, followed by cooling to 50° C. or less. 2-(dimethylamino) ethanol in an equivalent amount to acid groups was added thereto to neutralize the reaction product, and then deionized water was gradually added, thereby obtaining a hydroxy-containing polyester resin (B1) solution with a solids concentration of 45% and a pH of 7.2. The obtained hydroxy-containing polyester resin had an acid value of 35 mgKOH/g, a hydroxy value of 128 mgKOH/g, and a number average molecular weight of 1,480.

Production of Hydroxy-Containing Acrylic Resin (B2)

Production Example 23

30 parts of propylene glycol monopropyl ether was placed in a reactor equipped with a thermometer, a thermostat, a stirrer, a reflux condenser, a nitrogen inlet tube, and a dropping funnel. After the temperature was increased to 85° C., a mixture of 6 parts of styrene, 30 parts of methyl methacrylate, 25 parts of n-butyl acrylate, 20 parts of 2-ethylhexyl acrylate, 13 parts of 4-hydroxybutyl acrylate, 6 parts of acrylic acid, 10 parts of propylene glycol monopropyl ether, and 2 parts of 2,2'-azobis(2,4-dimethylvaleronitrile) was added dropwise to the flask over 4 hours. After completion of the dropwise addition, the mixture was aged for 1 hour. Thereafter, a mixture of 5 parts of propylene glycol monopropyl ether and 1 part of 2,2'-azobis(2,4-dimethylvaleronitrile) was further added dropwise to the flask over 1 hour. After completion of the dropwise addition, the mixture was aged for 1 hour. 7.4 parts of 2-(dimethylamino) ethanol was further added to the mixture to neutralize it, and deionized water was then gradually added, thereby obtaining a hydroxy-containing acrylic resin (B2) solution with a solids concentration of 40%. The obtained hydroxy-containing acrylic resin had an acid value of 47 mgKOH/g, a hydroxy value of 51 mgKOH/g, and a weight average molecular weight of 50000.

Production of Hydroxy-Containing Acrylic Resin (B3)

Production Example 24

145 parts of deionized water and 1.2 parts of Newcol 562SF (Note 1) were placed in a reactor equipped with a thermometer, a thermostat, a stirrer, a reflux condenser, and a dropping funnel, and the mixture was blended with stirring in a nitrogen stream, followed by heating to 80° C. Subsequently, 1% of the entire amount of the following monomer emulsion 1 and 5.2 parts of a 3% ammonium persulfate aqueous solution were introduced into the reactor and maintained at 80° C. for 15 minutes. Thereafter, the remaining monomer emulsion 1 was added dropwise to the reactor over 3 hours. After completion of the dropwise addition, the mixture was aged for 1 hour. Thereafter, the following monomer emulsion 2 was added dropwise over 2 hours, and the mixture was aged for 1 hour. While 89 parts of a 1.5% dimethylethanolamine aqueous solution was gradually added to the reactor, the content was cooled to 30° C., followed by discharge by filtration through a 100-mesh nylon cloth, thereby obtaining hydroxy-containing acrylic resin (B3) (solids content: 25.2%) with an average particle size of 100 nm, an acid value of 30.7 mgKOH/g, and a hydroxy value of 22.1 mgKOH/g.

Note 1: Newcol 562SF, produced by Nippon Nyukazai Co., Ltd., trade name, ammonium polyoxyethylene alkyl benzene sulfonate, active component 60%.

Monomer Emulsion 1: 94.3 parts of deionized water, 17 parts of methyl methacrylate, 80 parts of n-butyl acrylate, 3 parts of allyl methacrylate, and 1.2 parts of Newcol562SF were mixed with stirring, thereby obtaining monomer emulsion 1.

Monomer Emulsion 2: 39 parts of deionized water, 15.4 parts of methyl methacrylate, 2.9 parts of n-butyl acrylate, 5.9 parts of hydroxyethyl acrylate, 5.1 parts of methacrylic acid, and 0.5 parts of Newcol 562SF were mixed with stirring, thereby obtaining monomer emulsion 2.

Production of Aqueous Coating Composition (Aqueous Intermediate Coating Composition)

Example 1

38 parts of the acrylic-modified polyester resin (A1) solution obtained in Production Example 1 (resin solids content: 15 parts), 120 parts of JR-806 (trade name, produced by Tayca Corporation, rutile-type titanium dioxide), 1 part of Carbon MA-100 (trade name, produced by Mitsubishi Chemical Corporation, carbon black), 15 parts of Bariace B-35 (trade name, produced by Sakai Chemical Industry Co., Ltd., barium sulfate powder, average primary particle size: 0.5 μm), 10 parts of MICRO ACE S-3 (trade name, produced by Nippon Talc Co., Ltd., talc powder, average primary particle size: 4.8 μm), and 20 parts of deionized water were mixed, and adjusted with 2-(dimethylamino) ethanol to a pH of 8.5, followed by dispersing with a paint shaker for 30 minutes, thereby obtaining a pigment dispersion paste.

Subsequently, 204 parts of the obtained pigment dispersion paste, 11 parts of the hydroxy-containing polyester resin (B1) solution obtained in Production Example 22 (resin solids content: 5 parts), 50 parts of the hydroxy-containing acrylic resin (B2) solution obtained in Production Example 23 (resin solids content: 20 parts), 38 parts of melamine resin (C1) (methyl-butyl mixed etherified melamine resin, solids content: 80%, weight average molecular weight: 800) (resin solids content: 30 parts), and 75 parts of polyurethane resin (B4) (UCOAT UX-485, produced by Sanyo Chemical Industries, Ltd., polycarbonate-based, solids content: 40%) (resin solids content: 30 parts) were homogeneously mixed.

Subsequently, UH-752 (trade name, produced by Adeka Corporation, associative urethane thickener), 2-(dimethylamino) ethanol, and deionized water were added to the obtained mixture, thereby obtaining aqueous intermediate coating composition No. 1 with a pH of 8.5, a solids concentration of 50%, and a viscosity of 3000 mPa·s as measured at 20° C. with a six-speed rotational B-type viscometer.

Examples 2 to 20 and Comparative Examples 1 to 4

Aqueous intermediate coating compositions No. 2 to No. 24 with a pH of 8.5, a solids concentration of 50 mass %, and a viscosity of 3000 mPa·s as measured at 20° C. with a six-speed rotational B-type viscometer were obtained in the same manner as in Example 1, except that the acrylic-modified polyester resin and the formulation of Example 1 were changed as shown in Table 2.

Aqueous intermediate coating compositions No. 21 to No. 24 are Comparative Examples.

Examples 21 to 40 and Comparative Examples 5 to 8

The following evaluation tests were performed on aqueous intermediate coating compositions No. 1 to 24 obtained in Examples 1 to 20 and Comparative Examples 1 to 4. Table 2 also shows the evaluation results.

Storage Stability: after storage at 30° C. for 30 days, the change in viscosity from the initial viscosity as measured with a six-speed rotational B-type viscometer was evaluated. An increase or decrease in viscosity by 50% or less is a working level.

ΔB6(%)–100×(viscosity after storage–initial viscosity)/initial viscosity

Test plates were prepared as described below, and chipping resistance and finished appearance (distinctness of image, popping resistance, sag resistance) were evaluated.

Preparation of Test Substrate

ELECRON GT-10 (trade name, produced by Kansai Paint Co., Ltd.; a cationic electrodeposition coating composition) was applied by electrodeposition to cold-rolled steel plates treated with zinc phosphate to give a dry film thickness of 20 µm, and cured by heating at 170° C. for 30 minutes, thereby preparing test substrates.

Preparation of Test Plate

The test substrates were electrostatically coated with each aqueous intermediate coating composition with a rotary atomization electrostatic coater to give a cured film thickness of 40 µm. After being allowed to stand for 5 minutes, each substrate was preheated at 80° C. for 3 minutes, and then heated at 140° C. for 30 minutes, thereby forming an intermediate coating film. Further, WBC-713T No. 1F7 (trade name, produced by Kansai Paint Co., Ltd., an acrylic melamine resin-based aqueous basecoat coating composition, silver color) was electrostatically applied to each intermediate coating film with a rotary atomization electrostatic coater to give a cured film thickness of 15 µm, thereby forming a basecoat coating film. After being allowed to stand for 3 minutes, each substrate was preheated at 80° C. for 3 minutes, and Magicron KINO-1210 (trade name, produced by Kansai Paint Co., Ltd., an acrylic resin-based solvent-based top clear coating composition) was electrostatically applied to the uncured basecoat coating film to give a cured film thickness of 35 µm, thereby forming a clear coating film. After being allowed to stand for 7 minutes, each substrate was heated at 140° C. for 30 minutes, and the basecoat coating film and the clear coating film were cured, thereby preparing test plates.

Chipping Resistance: a test plate was placed on the specimen bench of a JA-400 gravel test instrument produced by Suga Test Instruments Co., Ltd. (a chipping resistance test apparatus), and 100 g of crushed granite stones (particle size No. 6) were allowed to hit the test plate at 0.392 MPa (4 kgf/cm$^2$) at an angle of 45° at –20° C. from a distance of 30 an with compressed air. Thereafter, the test plate was washed with water and dried. Cloth adhesive tape (produced by Nichiban Co., Ltd.) was adhered to the coated surface and peeled off. The degree of scratch generation on the coating film was visually observed and evaluated in accordance with the following criteria. Ratings S and A are workable levels.

S: The size of a scratch is very small, and the electrodeposited surface and the steel plate (base material) are not exposed.

A: The size of a scratch is small, and the electrodeposited surface and the steel plate (base material) are not exposed.

B: Although the size of a scratch is small, the electrodeposited surface and the steel plate (base material) are exposed.

C: The size of a scratch is significantly large, and the steel plate (base material) is considerably exposed.

Distinctness of Image: distinctness of image was evaluated from an LW value and a SW value measured with Wave Scan DOI (trade name, produced by BYK Gardner). The LW value is an index of the amplitude of surface roughness at a wavelength of about 1.2 to 20 mm. A smaller LW value indicates a higher smoothness of the coated surface. The SW value is an index of the amplitude of surface roughness at a wavelength of about 0.16 to 1.2 mm. A smaller SW value indicates a thick-appearing coating surface, and higher sheen and luster. An LW value of 15 or less and a SW value of 20 or less are workable levels.

Popping Resistance: popping resistance was evaluated according to the number of generated wakipins (pinholes, marks of popping bubbles) per unit area (30×15 cm).

Sag Resistance: separately, using a test substrate of 15×20 an with a 1-cm hole made at 10 an to the left and 4 an down from the upper-right corner, a test plate was prepared in the same manner as above, except that after application of a coating composition, the plate was heated with it standing upright. The plate was evaluated based on the length of sag from the bottom of the hole in accordance with the following criteria. Ratings A and B in the following criteria are workable levels.

A: No sag occurred.
B: Sagging with a length of less than 2 mm is observed.
C: Sagging with a length of 2 mm or more is observed.

TABLE 2

| | | | | Example | | | | | | | | | | | |
|---|---|---|---|---|---|---|---|---|---|---|---|---|---|---|---|
| | | | | 1 | 2 | 3 | 4 | 5 | 6 | 7 | 8 | 9 | 10 | 11 | 12 |
| | | | | 21 | 22 | 23 | 24 | 25 | 26 | 27 | 28 | 29 | 30 | 31 | 32 |
| Aqueous Intermediate Coating Composition No. | | | | 1 | 2 | 3 | 4 | 5 | 6 | 7 | 8 | 9 | 10 | 11 | 12 |
| Pigment | Acrylic-modified | | Type | A1 | A2 | A3 | A4 | A5 | A6 | A7 | A8 | A9 | A10 | A11 | A12 |
| Dispersion | Polyester Resin (A) | | Amount | 15 | 15 | 15 | 15 | 15 | 15 | 15 | 15 | 15 | 15 | 15 | 15 |
| Paste | Pigment | | JR-806 | 120 | 120 | 120 | 120 | 120 | 120 | 120 | 120 | 120 | 120 | 120 | 120 |
| | | | Carbon MA-100 | 1 | 1 | 1 | 1 | 1 | 1 | 1 | 1 | 1 | 1 | 1 | 1 |
| | | | Bariace B-35 | 15 | 15 | 15 | 15 | 15 | 15 | 15 | 15 | 15 | 15 | 15 | 15 |
| | | | MICRO ACE S-3 | 10 | 10 | 10 | 10 | 10 | 10 | 10 | 10 | 10 | 10 | 10 | 10 |

TABLE 2-continued

| | | | | | | | | | | | | | |
|---|---|---|---|---|---|---|---|---|---|---|---|---|---|
| Reactive Group-containing Resin (B) | Hydroxy-containing Acrylic Resin (B2) | 20 | 20 | 20 | 20 | 20 | 20 | 20 | 20 | 20 | 20 | 20 | 20 |
| | Hydroxy-containing Polyester Resin (B1) | 5 | 5 | 5 | 5 | 5 | 5 | 5 | 5 | 5 | 5 | 5 | 5 |
| | Polyurethane Resin (B4) | 30 | 30 | 30 | 30 | 30 | 30 | 30 | 30 | 30 | 30 | 30 | 30 |
| Crosslinking Agent (C) | Melamine Resin (C1) | 30 | 30 | 30 | 30 | 30 | 30 | 30 | 30 | 30 | 30 | 30 | 30 |
| Performance of Coating Composition and Coated Film | Storage Stability — Δ B6 Viscosity Increase | 16% | 40% | 13% | 16% | 13% | 45% | 11% | 40% | 13% | 16% | 16% | 13% |
| | Popping Resistance — Number of Generated Pinholes | 0 | 0 | 0 | 0 | 0 | 0 | 0 | 0 | 0 | 0 | 0 | 0 |
| | Sag Resistance | A | A | A | A | A | A | B | A | B | A | A | A |
| | Distinctness of Image — LW | 10 | 10 | 10 | 11 | 9 | 11 | 10 | 10 | 9 | 10 | 10 | 10 |
| | Distinctness of Image — SW | 12 | 12 | 14 | 14 | 14 | 13 | 12 | 13 | 12 | 12 | 11 | 13 |
| | Chipping Resistance | S | S | S | S | S | S | S | S | S | S | A | A |

| | | | Example | | | | | | | | Comparative Example | | | |
|---|---|---|---|---|---|---|---|---|---|---|---|---|---|---|
| | | | 13 | 14 | 15 | 16 | 17 | 18 | 19 | 20 | 1 | 2 | 3 | 4 |
| | | | 33 | 34 | 35 | 36 | 37 | 38 | 39 | 40 | 5 | 6 | 7 | 8 |
| Aqueous Intermediate Coating Composition No. | | | 13 | 14 | 15 | 16 | 17 | 18 | 19 | 20 | 21 | 22 | 23 | 24 |
| Pigment Dispersion Paste | Acrylic-modified Polyester Resin (A) | Type | A13 | A14 | A15 | A16 | A17 | A1 | A1 | A1 | A18 | A19 | A20 | A21 |
| | | Amount | 15 | 15 | 15 | 15 | 15 | 15 | 15 | 15 | 15 | 15 | 15 | 15 |
| | Pigment | JR-806 | 120 | 120 | 120 | 120 | 120 | 120 | 120 | 120 | 120 | 120 | 120 | 120 |
| | | Carbon MA-100 | 1 | 1 | 1 | 1 | 1 | 1 | 1 | 1 | 1 | 1 | 1 | 1 |
| | | Bariace B-35 | 15 | 15 | 15 | 15 | 15 | 15 | 15 | 15 | 15 | 15 | 15 | 15 |
| | | MICRO ACE S-3 | 10 | 10 | 10 | 10 | 10 | 10 | 10 | 10 | 10 | 10 | 10 | 10 |
| Reactive Group-containing Resin (B) | Hydroxy-containing Acrylic Resin (B2) | | 20 | 20 | 20 | 20 | 20 | 20 | 20 | 20 | 20 | 20 | 20 | 20 |
| | Hydroxy-containing Polyester Resin (B1) | | 5 | 5 | 5 | 5 | 5 | 5 | 5 | 5 | 5 | 5 | 5 | 5 |
| | Polyurethane Resin (B4) | | 30 | 30 | 30 | 30 | 30 | 25 | 35 | 30 | 30 | 30 | 30 | 30 |
| Crosslinking Agent (C) | Melamine Resin (C1) | | 30 | 30 | 30 | 30 | 30 | 35 | 25 | 25 | 30 | 30 | 30 | 30 |
| Performance of Coating Composition and Coated Film | Storage Stability | Δ B6 Viscosity Increase | 11% | 13% | 24% | −5% | 8% | 45% | 46% | 34% | 69% | 108% | 101% | 26% |
| | Popping Resistance | Number of Generated Pinholes | 0 | 0 | 0 | 0 | 0 | 0 | 0 | 0 | 2 | 4 | 6 | 0 |
| | Sag Resistance | | A | A | A | A | A | A | A | A | A | C | C | A |
| | Distinctness of Image | LW | 11 | 10 | 10 | 11 | 11 | 10 | 12 | 12 | 12 | 13 | 9 | 10 |
| | of Image | SW | 13 | 12 | 12 | 13 | 12 | 10 | 14 | 14 | 15 | 14 | 18 | 12 |
| | Chipping Resistance | | A | A | S | S | S | A | S | A | S | S | A | B |

Examples 41 to 60 and Comparative Examples 9 to 12

Test plates were prepared in the same manner as in Examples 21 to 40 and Comparative Examples 5 to 8, except that the preparation of test plates was as described below. The test plates were then evaluated for chipping resistance and finished appearance (distinctness of image, popping resistance, and sag resistance) in the same manner. Table 3 shows the results.

Preparation of Test Plates

The test substrates were electrostatically coated with each aqueous intermediate coating composition with a rotary atomization electrostatic coater to give a cured film thickness of 40 μm. After the test substrates were allowed to stand for 2 minutes, WBC-713T No. 1F7 (trade name, produced by Kansai Paint Co., Ltd., an acrylic melamine resin-based aqueous basecoat coating composition, silver color) was electrostatically applied to each uncured intermediate coating film with a rotary atomization electrostatic coater to give a cured film thickness of 15 μm. After being allowed to stand for 5 minutes, the substrates were preheated at 80° C. for 3 minutes.

Subsequently, Magicron KINO-1210 (trade name, produced by Kansai Paint Co., Ltd., an acrylic resin-based solvent-based top clear coating composition) was electrostatically applied to each uncured basecoat coating film to give a cured film thickness of 35 μm. After being allowed to stand for 7 minutes, the substrates were heated at 140° C. for 30 minutes, and each multilayer coating film composed of an intermediate coating film, a basecoat coating film, and a clear coating film was cured, thereby preparing test plates.

TABLE 3

| | | | Example | | | | | | | | | | | |
|---|---|---|---|---|---|---|---|---|---|---|---|---|---|---|
| | | | 41 | 42 | 43 | 44 | 45 | 46 | 47 | 48 | 49 | 50 | 51 | 52 |
| Aqueous Intermediate Coating Composition No. | | | 1 | 2 | 3 | 4 | 5 | 6 | 7 | 8 | 9 | 10 | 11 | 12 |
| Performance of Coated Film | Popping Resistance | Number of Generated Pinholes | 0 | 0 | 0 | 0 | 0 | 0 | 0 | 0 | 0 | 0 | 0 | 0 |
| | Sag Resistance | | A | A | A | A | A | A | B | A | B | A | A | A |
| | Distinctness of Image | LW | 13 | 14 | 13 | 12 | 12 | 14 | 14 | 14 | 12 | 13 | 13 | 13 |
| | | SW | 18 | 17 | 19 | 18 | 20 | 18 | 20 | 18 | 19 | 19 | 19 | 20 |
| | Chipping Resistance | | S | S | S | S | S | S | S | S | S | S | A | A |

TABLE 3-continued

|  |  |  | Example | | | | | | | | Comparative Example | | | |
| --- | --- | --- | --- | --- | --- | --- | --- | --- | --- | --- | --- | --- | --- | --- |
|  |  |  | 53 | 54 | 55 | 56 | 57 | 58 | 59 | 60 | 9 | 10 | 11 | 12 |
| Aqueous Intermediate Coating Composition No. | | | 13 | 14 | 15 | 16 | 17 | 18 | 19 | 20 | 21 | 22 | 23 | 24 |
| Performance of Coated Film | Popping Resistance | Number of Generated Pinholes | 0 | 0 | 0 | 0 | 0 | 0 | 0 | 0 | 2 | 8 | 10 | 0 |
|  | Sag Resistance |  | A | A | A | A | A | A | A | A | A | C | C | A |
|  | Distinctness of Image | LW | 13 | 13 | 13 | 14 | 14 | 12 | 15 | 15 | 15 | 15 | 12 | 13 |
|  |  | SW | 18 | 18 | 19 | 17 | 17 | 19 | 17 | 16 | 20 | 19 | 32 | 18 |
| Chipping Resistance | | | A | A | S | S | S | A | S | A | S | S | A | B |

Production of Aqueous Coating Composition
(Aqueous Basecoat Coating Composition)

Example 61

37.5 parts of Cymel 325 (produced by Cytec Industries Japan LLC, methyl/butyl mixed etherified melamine resin, solids content: 80%) (resin solids content: 30 parts), 79.4 parts of the hydroxy-containing acrylic resin (B3) (solids content: 25.2%) (resin solids content: 20 parts) obtained in Production Example 24, and 50 parts of the acrylic-modified polyester resin (A1) solution (resin solids content: 20 parts) obtained in Production Example 1 were sequentially added to 66.7 parts of the hydroxy-containing polyester resin (B1) solution (resin solids content: 30 parts) obtained in Production Example 22 with stirring, and homogeneously mixed.

Thereafter, a GX180A aluminum paste (produced by Asahi Kasei Corporation; aluminum flake paste), which was equivalent to 20 parts of an aluminum pigment content, was added thereto with stirring, mixed, and dispersed. Further, Primal ASE-60 (produced by Rohm and Haas; an alkaline viscous acrylic emulsion-based thickener), dimethylethanolamine, and deionized water were added, thereby obtaining aqueous basecoat coating composition No. 1 with a pH of 8.0, a solids concentration of 25 mass %, and a viscosity of 4000 mPa·s as measured at 20° C. with a six-speed rotational B-type viscometer.

Examples 62 to 80 and Comparative Examples 13 to 16

Aqueous basecoat coating compositions No. 2 to No. 24 with a pH of 8.0, a solids concentration of 25 mass %, and a viscosity of 4000 mPa·s as measured at 20° C. with a six-speed rotational B-type viscometer were obtained in the same manner as in Example 61, except that the formulation of Example 61 was changed as shown in Table 4.

Aqueous basecoat coating compositions No. 21 to No. 24 are Comparative Examples.

Examples 81 to 100 and Comparative Examples 17 to 20

The following evaluation tests were performed on aqueous basecoat coating compositions No. 1 to 24 obtained in Examples 61 to 80 and Comparative Examples 13 to 16.

Test plates were prepared in the same manner as in Examples 21 to 40 and Comparative Examples 5 to 8, except that the preparation of test plates was as described below. The test plates were then evaluated for chipping resistance and finished appearance (distinctness of image) in the same manner above and also for storage stability based on the increase in viscosity from the initial viscosity in the same manner as above. Table 4 also shows the evaluation results.

Preparation of Test Plates

An aqueous intermediate coating composition X (see details below) was electrostatically applied to the test substrates with a rotary atomization electrostatic coater to give a cured film thickness of 20 μm. After being allowed to stand for 5 minutes, the substrates were preheated at 80° C. for 3 minutes. Subsequently, the aqueous basecoat coating compositions were individually electrostatically applied to the uncured intermediate coating films with a rotary atomization electrostatic coater to give a cured film thickness of 15 μm. After being allowed to stand for 5 minutes, the substrates were preheated at 80° C. for 3 minutes.

Subsequently, Magicron KINO-1210 (trade name, produced by Kansai Paint Co., Ltd., an acrylic resin-based solvent-based top clear coating composition) was electrostatically applied to each uncured basecoat coating film to give a cured film thickness of 35 μm. After being allowed to stand for 7 minutes, the substrates were heated at 140° C. for 30 minutes, and each multilayer coating film composed of an intermediate coating film, a basecoat coating film, and a clear coating film was cured, thereby preparing test plates. Note: Aqueous Intermediate Coating Composition X 51 parts of a hydroxy-containing acrylic resin solution (i) (resin solids content: 20.4 parts), 87 parts of rutile-type titanium dioxide (trade name JR-806, produced by Tayca Corporation), 0.8 parts of carbon black (trade name, carbon MA-100, produced by Mitsubishi Chemical Corporation), and 50 parts of deionized water were mixed and adjusted to a pH of 8.0 with 2-(dimethylamino) ethanol, followed by dispersing with a paint shaker for 30 minutes, thereby obtaining a pigment dispersion paste.

Subsequently, 189 parts of the obtained pigment dispersion paste, 83.3 parts of a hydroxy-containing acrylic resin dispersion (ii), 75 parts of a urethane resin emulsion (trade name UCOAT UX-485, a polycarbonate-based urethane resin emulsion, solids content: 40%, produced by Sanyo Chemical Industries, Ltd.), and 35.7 parts of melamine resin (a methyl-etherified melamine resin, weight average molecular weight: 800, solids content: 70%) were homogeneously mixed.

Subsequently, ASE-60 (an alkaline swelling-type thickener, trade name, produced by Rohm and Haas), 2-(dimethylamino) ethanol, and deionized water were added to the obtained mixture, thereby obtaining aqueous intermediate coating composition X with a pH of 8.2, a solids content of the coating composition of 44%, and a viscosity of 30 seconds as measured at 20° C. with a Ford cup No. 4.
Hydroxy-containing Acrylic Resin Solution (i):

30 parts of propylene glycol monopropyl ether was placed in a reactor equipped with a thermometer, a thermostat, a stirrer, a reflux condenser, a nitrogen inlet tube, and a dropping funnel, and the temperature was increased to 85° C. A mixture of 10 parts of styrene, 30 parts of methyl methacrylate, 15 parts of 2-ethylhexyl acrylate, 11.5 parts of n-butyl acrylate, 30 parts of hydroxyethyl acrylate, 3.5 parts of acrylic acid, 10 parts of propylene glycol monopropyl ether, and 2 parts of 2,2'-azobis(2,4-dimethylvaleronitrile) was added dropwise thereto over 4 hours. After completion of dropwise addition, the mixture was aged for 1 hour. Thereafter, a mixture of 5 parts of propylene glycol monopropyl ether and 1 part of 2,2'-azobis(2,4-dimethylvaleronitrile) was further added dropwise to the flask over 1 hour. After completion of dropwise addition, the mixture was aged for 1 hour. 3.03 parts of 2-(dimethylamino) ethanol was further added, and deionized water was gradually added, thereby obtaining the hydroxy-containing acrylic resin solution (i) with a solids concentration of 40%. The obtained hydroxy-containing acrylic resin had an acid value of 27 mgKOH/g and a hydroxy value of 145 mgKOH/g.

Hydroxy-containing Acrylic Resin Dispersion (ii):

130 parts of deionized water and 0.52 parts of Aqualon KH-10 (trade name, produced by DKS Co. Ltd., polyoxyethylene alkyl ether sulfate ester ammonium salt, active component: 97%) were placed in a reactor equipped with a thermometer, a thermostat, a stirrer, a reflux condenser, a nitrogen inlet tube, and a dropping funnel, and mixed with stirring in a nitrogen stream, followed by increasing the temperature to 80° C. Subsequently, 1% of the entire amount of the following monomer emulsion (1) and 5.3 parts of a 6% ammonium persulfate aqueous solution were introduced into the reactor, and the mixture was maintained at 80° C. for 15 minutes. Subsequently, the remaining monomer emulsion (1) was then added dropwise to the reactor maintained at the same temperature over 3 hours. After completion of dropwise addition, the mixture was aged for 1 hour.

Subsequently, the following monomer emulsion (2) was added dropwise over 1 hour. After aging for 1 hour, the content was cooled to 30° C. while 40 parts of a 5% 2-(dimethylamino) ethanol aqueous solution was gradually added to the reactor, followed by filtration with a 100-mesh nylon cloth, thereby obtaining as a filtrate the hydroxy-containing acrylic resin dispersion (ii) with an average particle size of 108 nm (measured at 20° C. with a submicrometer particle size distribution analyzer, COULTER N4, produced by Beckman Coulter, Inc., after dilution with deionized water) and a solids concentration of 30%. The obtained hydroxy-containing acrylic resin had an acid value of 33 mgKOH/g and a hydroxy value of 25 mgKOH/g.

Monomer Emulsion (1): 42 parts of deionized water, 0.72 parts of Aqualon KH-10, 2.1 parts of methylenebisacrylamide, 2.8 parts of styrene, 16.1 parts of methyl methacrylate, 38 parts of ethyl acrylate, and 11 parts of n-butyl acrylate were mixed with stirring, thereby obtaining monomer emulsion (1).

Monomer Emulsion (2): 18 parts of deionized water, 0.31 parts of Aqualon KH-10, 0.03 parts of ammonium persulfate, 5.1 parts of methacrylic acid, 5.1 parts of 2-hydroxyethyl acrylate, 3 parts of styrene, 6 parts of methyl methacrylate, and 10.8 parts of n-butyl acrylate were mixed with stirring, thereby obtaining monomer emulsion (2).

Separately, test plates were prepared as described below, and popping resistance and sag resistance were evaluated.

The aqueous basecoat coating compositions were individually electrostatically applied to the test substrates with a rotary atomization electrostatic coater to give a cured film thickness of 25 μm, thereby forming basecoat coating films. After being allowed to stand for 3 minutes, the substrates were preheated at 80° C. for 3 minutes, and Magicron KINO-1210 (trade name, produced by Kansai Paint Co., Ltd., an acrylic resin-based solvent-based top clear coating composition) was electrostatically applied to each uncured basecoat coating film to give a cured film thickness of 25 μm, thereby forming a clear coating film. After being allowed to stand for 7 minutes, the substrates were heated at 140° C. for 30 minutes, and each basecoat coating film and clear coating film were cured, thereby obtaining test plates.

Popping Resistance: popping resistance was evaluated according to the number of generated wakipins (pinholes, marks of popping bubbles) per unit area (30×15 an).

Sag Resistance: separately, using a test substrate of 15×20 cm with a 1-am hole made at 10 an to the left and 4 an down from the upper right corner, a test plate was prepared in the same manner as above, except that after application of a coating composition, the plate was heated with it standing upright. The plate was evaluated based on the length of sag from the bottom of the hole in accordance with the following criteria. Ratings A and B in the following criteria are workable levels.

A: No sag occurred.
B: Sagging with a length of less than 2 mm is observed.
C: Sagging with a length of 2 mm or more is observed.

TABLE 4

| | | | Example | | | | | | | | | | | | |
|---|---|---|---|---|---|---|---|---|---|---|---|---|---|---|---|
| | | | 61 | 62 | 63 | 64 | 65 | 66 | 67 | 68 | 69 | 70 | 71 | 72 |
| | | | 81 | 82 | 83 | 84 | 85 | 86 | 87 | 88 | 89 | 90 | 91 | 92 |
| Aqueous Basecoat Coating Composition No. | | | 1 | 2 | 3 | 4 | 5 | 6 | 7 | 8 | 9 | 10 | 11 | 12 |
| Reactive Group-containing Resin (B) | Hydroxy-containing Polyester Resin (B1) | | 30 | 30 | 30 | 30 | 30 | 30 | 30 | 30 | 30 | 30 | 30 | 30 |
| | Hydroxy-containing Acrylic Resin (B3) | | 20 | 20 | 20 | 20 | 20 | 20 | 20 | 20 | 20 | 20 | 20 | 20 |
| Crosslinking Agent (C) | Cymel 325 | | 30 | 30 | 30 | 30 | 30 | 30 | 30 | 30 | 30 | 30 | 30 | 30 |
| Acrylic-modified Polyester Resin (A) | | | A1 | A2 | A3 | A4 | A5 | A6 | A7 | A8 | A9 | A10 | A11 | A12 |
| | | | 20 | 20 | 20 | 20 | 20 | 20 | 20 | 20 | 20 | 20 | 20 | 20 |
| | GX180A | | 20 | 20 | 20 | 20 | 20 | 20 | 20 | 20 | 20 | 20 | 20 | 20 |
| Performance of Coating Composition and Coated Film | Storage Stability | $\Delta$ B6 Viscosity Increase | 31% | 38% | 25% | 23% | 27% | 45% | 22% | 44% | 32% | 30% | 27% | 27% |
| | Popping Resistance | Number of Generated Pinholes | 0 | 0 | 0 | 0 | 0 | 0 | 0 | 0 | 0 | 0 | 0 | 0 |
| | Sag Resistance | | A | A | A | A | A | A | A | A | A | A | A | A |
| | Distinctness of Image | LW | 12 | 13 | 12 | 13 | 13 | 13 | 14 | 14 | 12 | 11 | 12 | 14 |
| | | SW | 18 | 16 | 18 | 19 | 20 | 18 | 19 | 16 | 19 | 19 | 20 | 18 |
| | Chipping Resistance | | S | S | S | S | S | S | S | S | S | S | A | A |

TABLE 4-continued

| | | | Example | | | | | | | | Comparative Example | | | |
|---|---|---|---|---|---|---|---|---|---|---|---|---|---|---|
| | | | 73 | 74 | 75 | 76 | 77 | 78 | 79 | 80 | 13 | 14 | 15 | 16 |
| | | | 93 | 94 | 95 | 96 | 97 | 98 | 99 | 100 | 17 | 18 | 19 | 20 |
| Aqueous Basecoat Coating Composition No. | | | 13 | 14 | 15 | 16 | 17 | 18 | 19 | 20 | 21 | 22 | 23 | 24 |
| Reactive Group-containing Resin (B) | Hydroxy-containing Polyester Resin (B1) | | 30 | 30 | 30 | 30 | 30 | 30 | 30 | 35 | 30 | 30 | 30 | 30 |
| | Hydroxy-containing Acrylic Resin (B3) | | 20 | 20 | 20 | 20 | 20 | 15 | 25 | 20 | 20 | 20 | 20 | 20 |
| Crosslinking Agent (C) | Cymel 325 | | 30 | 30 | 30 | 30 | 30 | 35 | 25 | 25 | 30 | 30 | 30 | 30 |
| Acrylic-modified Polyester Resin (A) | | | A13 | A14 | A15 | A16 | A17 | A1 | A1 | A1 | A18 | A19 | A20 | A21 |
| | | | 20 | 20 | 20 | 20 | 20 | 20 | 20 | 20 | 20 | 20 | 20 | 20 |
| GX180A | | | 20 | 20 | 20 | 20 | 20 | 20 | 20 | 20 | 20 | 20 | 20 | 20 |
| Performance of Coating Composition and Coated Film | Storage Stability | $\Delta$ B6 Viscosity Increase | 25% | 30% | 23% | 19% | 25% | 14% | 44% | 30% | 82% | 138% | 150% | 39% |
| | Popping Resistance | Number of Generated Pinholes | 0 | 0 | 0 | 0 | 0 | 0 | 0 | 0 | 1 | 8 | 8 | 0 |
| | Sag Resistance | | A | A | A | A | A | A | A | A | A | C | C | A |
| | Distinctness of Image | LW | 13 | 14 | 14 | 15 | 13 | 11 | 14 | 13 | 15 | 14 | 13 | 12 |
| | | SW | 18 | 19 | 18 | 16 | 17 | 18 | 15 | 17 | 18 | 18 | 20 | 17 |
| | Chipping Resistance | | A | A | S | S | S | S | S | A | S | S | A | B |

Production of Aqueous Coating Composition
(Aqueous Primer Coating Composition)

Example 101

30 parts (on a solids mass basis) of aqueous chlorinated polypropylene (maleic acid-modified chlorinated polypropylene aqueous dispersion having an acid value of 35 mgKOH/g caused by maleic acid modification, and a chlorine content of 22%), 5 parts (on a solids mass basis) of a hydroxy-containing acrylic emulsion (iii), 30 parts (on a solids mass basis) of the acrylic-modified polyester resin (A1) obtained in Production Example 1, 15 parts (on a solids mass basis) of a hydroxy-containing acrylic resin (iv) solution, 10 parts (on a solids mass basis) of a polyester resin (v), 10 parts (on a solids mass basis) of Bayhydur VPLS2310 (trade name, Sumika Bayer Urethane Co., Ltd, an oxime-blocked polyisocyanate compound), 100 parts of JR-806 (produced by Tayca Corporation, trade name, titanium white), and 5 parts of Ketjenblack EC600J (produced by Lion Akzo Co., Ltd., trade name, a conductive carbon black pigment) were blended, mixed, and dispersed in accordance with an ordinary method, followed by dilution with deionized water to give a solids content of 20%, thereby obtaining aqueous primer coating composition No. 1.

Production of Hydroxy-Containing Acrylic Emulsion (iii)

144.5 parts of deionized water and 12 parts of Newcol 562SF (produced by Nippon Nyukazai Co., Ltd., trade name, ammonium polyoxyethylene alkylbenzene sulfonate, active component: 60%) were placed in a reactor equipped with a stirrer, a reflux condenser, and a thermometer, and mixed with stirring in a nitrogen stream, followed by increasing the temperature to 80° C. Subsequently, 1% of monomer emulsion (I) composed of 56.2 parts of cyclohexyl methacrylate, 20 parts of n-butyl acrylate, 21 parts of 2-hydroxyethyl acrylate, 2.8 parts of acrylic acid, 1.75 parts of Newcol 707SF (produced by Nippon Nyukazai Co., Ltd., trade name, a surfactant, active component: 30%), and 94.3 parts of deionized water, and 5.2 parts of a 3% ammonium persulfate aqueous solution were placed in the reactor, and maintained at 80° C. for 15 minutes. Thereafter, the remaining monomer emulsion (I) was added dropwise to the reactor over 3 hours. After completion of dropwise addition, the mixture was aged for 1 hour, thereby obtaining the hydroxy-containing acrylic emulsion (iii) with an average particle size of 100 nm, an acid value of 22 mgKOH/g, a hydroxy value of 101 mgKOH/g, and a weight average molecular weight of about 200,000.

Production of Hydroxy-Containing Acrylic Resin (iv) Solution 40 parts of propylene glycol monomethyl ether was placed in a reactor equipped with a stirrer, a reflux condenser, and a thermometer, and maintained with heating at 120° C. A mixture of 53 parts of cyclohexyl methacrylate, 20 parts of n-butyl acrylate, 21 parts of 2-hydroxyethyl acrylate, 6 parts of acrylic acid, and 5 parts of azobisisobutyronitrile was added dropwise thereto over 3 hours. After completion of dropwise addition, the mixture was aged at the same temperature for 1 hour, and a mixture solution of 1 part of azobisdimethylvaleronitrile and 10 parts of propylene glycol monomethyl ether was added dropwise over 1 hour. After additional aging for 1 hour, 7.4 parts of dimethylethanolamine and 193 parts of deionized water were added with stirring, thereby obtaining the hydroxy-containing acrylic resin (iv) solution with an acid value of 47 mgKOH/g, a hydroxy value of 101 mgKOH/g, and a weight average molecular weight of about 10,000.

Production of Polyester Resin (v)

273 parts of trimethylol propane, 200 parts of succinic anhydride, and 490 parts of Cardura E10P (produced by Japan Epoxy Resin Co., Ltd., neodecanoic acid monoglycidyl ester) were placed in a reactor equipped with a stirrer, a reflux condenser, a water separator, and a thermometer, and allowed to react at 100 to 230° C. for 3 hours (a sample taken at this stage had a hydroxy value of 350 mgKOH/g and a number average molecular weight of 580). 192 parts of trimellitic anhydride was further added, and the mixture was subjected to condensation reaction at 180° C., thereby obtaining the polyester resin (v) with an acid value of 49 mgKOH/g, a hydroxy value of 195 mgKOH/g, and a number average molecular weight of 1,500.

Examples 102 to 120 and Comparative Examples 21 to 24 Aqueous primer coating compositions No. 2 to No. 24 were obtained in the same manner as in Example 101, except that the formulation of Example 101 was changed as shown in Table 5.

Aqueous primer coating compositions No. 21 to No. 24 are Comparative Examples.

The following evaluation tests were performed on aqueous primer coating compositions No. 1 to No. 24 obtained in Examples 101 to 120 and Comparative Examples 21 to 24. Table 5 also shows the evaluation results.

Test plates were prepared as described below, and finished appearance (distinctness of image, popping resistance, sag resistance), chipping resistance, and storage stability were evaluated in the same manner as in Examples 21 to 40 and Comparative Examples 5 to 8.

Preparation of Test Plate

On a degreased polypropylene plate (a test substrate), each aqueous primer coating composition was applied to give a film thickness of 30 μm by air spray coating, and preheated at 80° C. for 3 minutes. On each primer coating film, WBC-713T No. 1F7 (produced by Kansai Paint Co., Ltd., trade name, an aqueous basecoat coating composition), as a basecoat coating composition, was electrostatically applied to give a film thickness of 15 μm, and preheated at 80° C. for 3 minutes. Subsequently, Soflex #520 Clear (produced by Kansai Paint Co., Ltd., trade name, an acrylic urethane-based solvent-based clear coating composition), as a clear coat coating composition, was electrostatically applied to give a film thickness of 30 μm, and heated at 120° C. for 30 minutes, followed by curing the primer coating film, the basecoat coating film, and the clear coating film, thereby preparing test plates.

The evaluation criteria for chipping resistance were as follows. Ratings S and A are workable levels.
S: The size of a scratch is very small, and the surface of the base material (PP) is not exposed.
A: The size of a scratch is small, and the surface of the base material (PP) is not exposed.
B: Although the size of a scratch is small, the surface of the base material (PP) is exposed.
C: The size of a scratch is significantly large, and the surface of the base material (PP) is exposed.

An LW value of 20 or less and a SW value of 25 or less are workable levels in terms of distinctness of image.

TABLE 5

| | | | Example | | | | | | | | | | | | |
|---|---|---|---|---|---|---|---|---|---|---|---|---|---|---|---|
| | | | 101 | 102 | 103 | 104 | 105 | 106 | 107 | 108 | 109 | 110 | 111 | 112 |
| Aqueous Primer Coating Composition No. | | | 1 | 2 | 3 | 4 | 5 | 6 | 7 | 8 | 9 | 10 | 11 | 12 |
| Reactive Group-containing Resin (B) | Aqueous Chlorinated Polypropylene | | 30 | 30 | 30 | 30 | 30 | 30 | 30 | 30 | 30 | 30 | 30 | 30 |
| | Hydroxy-containing Acrylic Emulsion (iii) | | 5 | 5 | 5 | 5 | 5 | 5 | 5 | 5 | 5 | 5 | 5 | 5 |
| | Hydroxy-containing Acrylic Resin (iv) | | 15 | 15 | 15 | 15 | 15 | 15 | 15 | 15 | 15 | 15 | 15 | 15 |
| | Polyester Resin (v) | | 10 | 10 | 10 | 10 | 10 | 10 | 10 | 10 | 10 | 10 | 10 | 10 |
| Crosslinking Agent (C) | Bayhydur VPLS2310 | | 10 | 10 | 10 | 10 | 10 | 10 | 10 | 10 | 10 | 10 | 10 | 10 |
| Acrylic-modified Polyester Resin (A) | Type | | A1 | A2 | A3 | A4 | A5 | A6 | A7 | A8 | A9 | A10 | A11 | A12 |
| | Amount | | 30 | 30 | 30 | 30 | 30 | 30 | 30 | 30 | 30 | 30 | 30 | 30 |
| Pigment | Color Pigment | JR-806 | 100 | 100 | 100 | 100 | 100 | 100 | 100 | 100 | 100 | 100 | 100 | 100 |
| | | EC600J | 5 | 5 | 5 | 5 | 5 | 5 | 5 | 5 | 5 | 5 | 5 | 5 |
| Performance of Coating Composition and Coated Film | Storage Stability | ⊿ B6 Viscosity Increase | 24% | 33% | 20% | 29% | 26% | 39% | 15% | 42% | 20% | 16% | 26% | 27% |
| | Popping Resistance | Number of Generated Pinholes | 0 | 0 | 0 | 0 | 0 | 0 | 0 | 0 | 0 | 0 | 0 | 0 |
| | Sag Resistance | | A | A | A | A | A | A | A | A | A | A | A | A |
| | Distinctness of Image | LW | 18 | 17 | 19 | 17 | 18 | 19 | 19 | 18 | 17 | 19 | 19 | 18 |
| | | SW | 24 | 24 | 24 | 24 | 22 | 23 | 23 | 22 | 25 | 22 | 22 | 25 |
| | Chipping Resistance | | S | S | S | S | S | S | S | S | S | S | S | A |

| | | | Example | | | | | | | | Comparative Example | | | |
|---|---|---|---|---|---|---|---|---|---|---|---|---|---|---|
| | | | 113 | 114 | 115 | 116 | 117 | 118 | 119 | 120 | 21 | 22 | 23 | 24 |
| Aqueous Primer Coating Composition No. | | | 13 | 14 | 15 | 16 | 17 | 18 | 19 | 20 | 21 | 22 | 23 | 24 |
| Reactive Group-containing Resin (B) | Aqueous Chlorinated Polypropylene | | 30 | 30 | 30 | 30 | 30 | 30 | 30 | 30 | 30 | 30 | 30 | 30 |
| | Hydroxy-containing Acrylic Emulsion (iii) | | 5 | 5 | 5 | 5 | 5 | 5 | 5 | 5 | 5 | 5 | 5 | 5 |
| | Hydroxy-containing Acrylic Resin (iv) | | 15 | 15 | 15 | 15 | 15 | 10 | 15 | 10 | 15 | 15 | 15 | 15 |
| | Polyester Resin (v) | | 10 | 10 | 10 | 10 | 10 | 10 | 5 | 15 | 10 | 10 | 10 | 10 |
| Crosslinking Agent (C) | Bayhydur VPLS2310 | | 10 | 10 | 10 | 10 | 10 | 15 | 15 | 10 | 10 | 10 | 10 | 10 |
| Acrylic-modified Polyester Resin (A) | Type | | A13 | A14 | A15 | A16 | A17 | A1 | A1 | A1 | A18 | A19 | A20 | A21 |
| | Amount | | 30 | 30 | 30 | 30 | 30 | 30 | 30 | 30 | 30 | 30 | 30 | 30 |
| Pigment | Color Pigment | JR-806 | 100 | 100 | 100 | 100 | 100 | 100 | 100 | 100 | 100 | 100 | 100 | 100 |
| | | EC600J | 5 | 5 | 5 | 5 | 5 | 5 | 5 | 5 | 5 | 5 | 5 | 5 |
| Performance of Coating Composition and Coated Film | Storage Stability | ⊿ B6 Viscosity Increase | 20% | 18% | 24% | 20% | 21% | 48% | 45% | 37% | 99% | 102% | 107% | 22% |
| | Popping Resistance | Number of Generated Pinholes | 0 | 0 | 0 | 0 | 0 | 0 | 0 | 0 | 3 | 10 | 7 | 0 |
| | Sag Resistance | | A | A | A | A | A | A | A | A | C | C | A | A |
| | Distinctness of Image | LW | 19 | 18 | 19 | 20 | 18 | 19 | 20 | 19 | 19 | 19 | 17 | 18 |
| | | SW | 22 | 24 | 24 | 21 | 24 | 22 | 21 | 24 | 24 | 25 | 33 | 23 |
| | Chipping Resistance | | A | A | S | S | S | S | S | S | S | S | A | B |

The invention claimed is:

1. An aqueous coating composition comprising
   an acrylic-modified polyester resin (A) and
   a reactive-group-containing resin (B),
   the acrylic-modified polyester resin (A)
   comprising as a monomer component constituting the acrylic part, a polyoxyalkylene group-containing unsaturated monomer having a weight average molecular weight of 400 or more, and
   having a proportion of compounds having 6 or more carbon atoms in the total amount in the polyester-constituting components of 50 mass % or more.

2. The aqueous coating composition according to claim 1, wherein the compounds having 6 or more carbon atoms in the components constituting the polyester part is a compound containing an alkylene group having 4 or more carbon atoms.

3. The aqueous coating composition according to claim 1, wherein the proportion of the acrylic part is 5 to 40 mass % and the proportion of the polyester part is 60 to 95 mass % of the acrylic-modified polyester resin (A) (the total amount of the acrylic part and the polyester part).

4. The aqueous coating composition according to claim 1, wherein the acrylic part of the acrylic-modified polyester resin (A) has a hydroxy value of 0 to 70 mgKOH/g.

5. The aqueous coating composition according to claim 1, wherein the polyester part of the acrylic-modified polyester resin (A) has an acid value of 0 to 20 mgKOH/g.

6. The aqueous coating composition according to claim 1, further comprising a crosslinking agent (C).

7. An article comprising a coating film obtained by curing the aqueous coating composition of claim 1.

8. A method for forming a coating film, the method comprising applying the aqueous coating composition of claim 1 to a substrate.

* * * * *